US007937473B2

(12) United States Patent
Nakadai

(10) Patent No.: US 7,937,473 B2
(45) Date of Patent: May 3, 2011

(54) RESOURCE-AMOUNT CALCULATION SYSTEM, AND METHOD AND PROGRAM THEREOF

(75) Inventor: Shinji Nakadai, Tokyo (JP)

(73) Assignee: NEC Corporation, Tokyo (JP)

( * ) Notice: Subject to any disclaimer, the term of this patent is extended or adjusted under 35 U.S.C. 154(b) by 444 days.

(21) Appl. No.: 12/067,610

(22) PCT Filed: Sep. 20, 2006

(86) PCT No.: PCT/JP2006/318615
§ 371 (c)(1),
(2), (4) Date: Mar. 20, 2008

(87) PCT Pub. No.: WO2007/034826
PCT Pub. Date: Mar. 29, 2007

(65) Prior Publication Data
US 2009/0157870 A1 Jun. 18, 2009

(30) Foreign Application Priority Data
Sep. 20, 2005 (JP) .................................. 2005-272091

(51) Int. Cl.
*G06F 15/173* (2006.01)
(52) U.S. Cl. ......... 709/226; 709/223; 709/224; 709/225
(58) Field of Classification Search .......... 709/220–222, 709/223–226, 230–235
See application file for complete search history.

(56) References Cited

U.S. PATENT DOCUMENTS

| | | | | |
|---|---|---|---|---|
| 6,807,522 B1 * | 10/2004 | Orfali | ............................. | 703/22 |
| 6,973,622 B1 * | 12/2005 | Rappaport et al. | ............ | 715/735 |
| 7,058,560 B1 * | 6/2006 | Arakawa et al. | ................. | 703/22 |
| 7,184,933 B2 * | 2/2007 | Prekeges et al. | .............. | 702/186 |
| 7,475,108 B2 * | 1/2009 | Di Giulio et al. | ............. | 709/203 |
| 2002/0059427 A1 * | 5/2002 | Tamaki et al. | ................. | 709/226 |
| 2002/0152301 A1 * | 10/2002 | Garrett et al. | ................. | 709/224 |
| 2003/0154236 A1 * | 8/2003 | Dar et al. | ....................... | 709/201 |
| 2004/0267930 A1 * | 12/2004 | Giulio et al. | ................... | 709/225 |
| 2005/0138168 A1 * | 6/2005 | Hoffman et al. | ................ | 709/224 |
| 2005/0262258 A1 * | 11/2005 | Kohno et al. | ................... | 709/231 |
| 2009/0100133 A1 * | 4/2009 | Giulio et al. | ................... | 709/203 |
| 2009/0157870 A1 * | 6/2009 | Nakadai | ........................ | 709/224 |

FOREIGN PATENT DOCUMENTS

| | | |
|---|---|---|
| JP | 2002163241 | 6/2002 |
| JP | 2005182641 | 7/2005 |
| JP | 2005196601 | 7/2005 |
| JP | 3716753 | 9/2005 |

* cited by examiner

*Primary Examiner* — Shawki S Ismail
*Assistant Examiner* — Edward J Kim
(74) *Attorney, Agent, or Firm* — Sughrue Mion, PLLC

(57) ABSTRACT

A response-time-difference calculation/request-number converting means (523) calculates a change of throughput based on a response time monitoring result, a target value of the response time, a quantitative model and performance specification information. A server selection means (524) input the performance specification information in the quantitative model acquired to calculate a throughput of each of pool servers, selects a pool server having a throughput corresponding to a throughput larger than and closest to the change of throughput, and instructs provisioning means (513) to execute configuration modification control on the selected pool server (502). The provisioning means (513) modifies the configuration so that the pool server (502) functions as an application server.

17 Claims, 16 Drawing Sheets

FIG. 2

| RESOURCE ID | SERVICE ASSIGNMENT | PERFORMANCE SPECIFICATION (CPU CLOCK NUMBER) | SERVICE ASSIGNMENT 2 (MAIN MEMORY CAPACITY) | ... | MAIN MEMORY SPECIFICATION n |
|---|---|---|---|---|---|
| HOST1 | POOL | 1.4 | 512 | ... | |
| HOST2 | SERVICE1 | 2.0 | 1024 | ... | |
| HOST3 | POOL | 1.6 | 256 | ... | |

FIG. 3

| SERVICE ID | QUANTITATIVE MODEL | COEFFICIENT | CONSTANT |
|---|---|---|---|
| SERVICE 1 | MODEL 1 | (0.04, −0.005, −0.04) | 1 |
| SERVICE 2 | MODEL 1 | (0.1, −0.01, −0.3) | 0.8 |
| SERVICE 3 | MODEL 2 | (0.6, −0.1, −0.05) | 0.2 |

FIG. 4

| MODEL ID | | |
|---|---|---|
| MODEL 1 | RESPONSE TIME<br>= F (THROUGHPUT, SERVER PERFORMANCE SPECIFICATION) | d(RESPONSE TIME)/d(THROUGHPUT)<br>= δF(THROUGHPUT, SERVER PERFORMANCE SPECIFICATION)/δ (THROUGHPUT) |
| MODEL 1 | RESPONSE TIME<br>= COEFFICIENT 1 × THROUGHPUT<br>+ COEFFICIENT 2 × THROUGHPUT × CPU CLOCK NUMBER<br>+ COEFFICIENT 3 × CPU CLOCK NUMBER<br>+ CONSTANT | d(RESPONSE TIME)/d(THROUGHPUT)<br>= COEFFICIENT 1<br>+ COEFFICIENT 2 × CPU CLOCK NUMBER |
| MODEL 2 | RESPONSE TIME<br>= COEFFICIENT 1 × THROUGHPUT$^2$<br>+ COEFFICIENT 2 × THROUGHPUT<br>+ COEFFICIENT 3 × CPU CLOCK NUMBER<br>+ CONSTANT | d(RESPONSE TIME)/d(THROUGHPUT)<br>= 2 × COEFFICIENT 1 × THROUGHPUT<br>+ COEFFICIENT 2 |
| MODEL 3 | ... | ... |

903                                                                                              901

{ RESPONSE TIME = RESPONSE-TIME MONITORING RESULT

RESPONSE TIME = F(THROUGHPUT, SERVER PERFORMANCE SPECIFICATION) — 902

| RESOURCE ID | SERVICE ASSIGNMENT | PERFORMANCE SPECIFICATION (CPU CLOCK NUMBER) |
|---|---|---|
| SERVER 2011 | SERVICE 1 | 1.8 |
| SERVER 2012 | SERVICE 1 | 3.0 |
| SERVER 2013 | SERVICE 1 | 3.0 |
| SERVER 2021 | POOL | 1.8 |
| SERVER 2022 | POOL | 1.8 |
| SERVER 2023 | POOL | 3.0 |
| SERVER 2024 | POOL | 3.0 |

FIG. 14

| SERVICE ID | QUANTITATIVE MODEL | COEFFICIENT | CONSTANT |
|---|---|---|---|
| SERVICE 1 | MODEL 1 | (0.030, −0.0068, −0.33) | 1.20 |

RESOURCE-AMOUNT CALCULATION SYSTEM, AND METHOD AND PROGRAM THEREOF

TECHNICAL FIELD

The present invention relates to a resource-amount calculation system, and method and program thereof and, more particularly, to a resource-amount calculation system, and method and program thereof which are capable of increasing service quality up to a targeted level or suppressing deterioration of service quality caused by an increase in the number of accesses.

BACKGROUND ART

In some cases, a heavy load is applied from service consumers to a server providing a service such as contents or applications on a network. As a method for reducing such service request load on the server, one that uses a server load distribution apparatus is known. In this method, the address of servers at which services are stored is registered in the server load distribution apparatus. As a result, a variety of types of the service request received by the server load distribution apparatus are transferred to a registered server or redirected to another registered server, whereby the load of requests on each server is distributed.

Examples of the technique that distributes the requests received in the server load distribution apparatus among different servers during the request transfer or redirection include a round-robin technique in which requests are uniformly distributed among the registered servers, a weighted round-robin technique in which a weight for distributing the requests is changed in accordance with a load measurement result of each server. The term "weight" as used herein means a rate at which the requests are distributed. A use of the weighted round-robin technique allows the load of requests to be distributed uniformly even if there is some range of variation in the performance among the servers. Further, by changing the address list registered in the load distribution apparatus, it is possible to change the load applied on each server. That is, by adding or deleting the address to/from the list, the load applied on each server is decreased or increased.

An example of a server-resource management system is disclosed in U.S. Patent Application No. 2004/0181794, and E. Lassettre, et al "Dynamic Surge Protection: An Approach to Handling Unexpected Workload Surges with Resource Actions that Have Lead Times", (DSOM 2003, LNCS 2867), Springer, October 2003, pages 82 to 92. FIG. 18 is a block diagram showing an example of the configuration of a conventional server-resource management system.

As shown in FIG. 18, the conventional server-resource management system includes a management-targeted system 110 and a management system 100 for managing the system 110. The management-targeted system 110 includes an application server 111 for providing a specific service and pool servers 112 that can be used by plurality of services. The management system 100 includes a monitoring means 101 for monitoring service response time, throughput, etc., i.e., load on the application server, a load predicting means 102 for predicting a future load based on the past load data, a resource-capacity planning means 103 for calculating the amount of resources required for achieving service-level targeted value 104 specified by a service administrator in consideration of the future load, a server determining means 105 for selecting a server, and a provisioning means 106 for changing the configuration of the selected server and that of a related network.

The conventional server-resource management system having the above configuration operates as follows. That is, when the number of clients that issue requests to the application server 111, the monitoring means 101 that constantly monitoring the load on the application server transmits information related to the load to the load predicting means 102. The load predicting means 102 predicts the load in the future at a time instant after a predetermined time required for the provisioning means 106 to change a pool server 112 to an application server 111 has elapsed from the present time, and transmits the estimated value to the resource-capacity planning means 103. The resource-capacity planning means 103 determines whether or not the target service-level value 104 set by the service administrator can be achieved when the future load is applied to the application server 501. If the target service-level value 104 can be achieved, the resource-capacity planning means 103 does not transmit data to the server determining means 105. If it is determined that the target service-level value 104 cannot be achieved, the resource-capacity planning means 103 calculates the number of servers required to achieve the target service-level value 104 and transmits the calculation result to the server determining means 105. The server determining means 105 selects servers in number corresponding to the specified number of servers from the pool servers 112 and transmits information related to the selected servers to the provisioning means 106. The provisioning means 106 changes the setting of the selected server in the pool servers 112 as the application server 111. With the above operation, even if the number of requests is unexpectedly increased, the service level of the application server 111 can be controlled to the target service-level value 104. In the following description, the number of requests that a service receives per unit time and number of requests that a service processes per unit time are referred to as "throughput".

The conventional server-resource management system has the problem that when the number of accesses is unexpectedly increased under an environment where there is some range of variation in the performance between servers including the management-targeted application servers and pool servers, the service level is degraded or service availability is lowered.

The reason is that only the number of servers is calculated as the resources required for maintaining the service level, and the difference in the calculating performance between the servers is not taken into consideration. If the server performance considered in the course of calculation of required resource amount by which only the number of servers is calculated differs from the server performance in the server environment actually existing in the server-resource management system, there occurs a problem in that a server having an unnecessarily higher performance or, conversely, a server having an insufficient performance may be assigned to the service.

Further, in the conventional server-resource management system, if the number of accesses is unexpectedly increased, the accuracy with which the service request load is estimated may be deteriorated so that a server having an adequate resource amount cannot be assigned to the service. This may result in deterioration of the service level or reduction of the service availability.

The reason is as follows. That is, since the amount of resources is controlled by the number of servers in the conventional technique, a plurality of servers often need to be controlled when the server configuration is to be changed. Although it is possible to control a plurality of servers in parallel, processing needs to be executed in a successive manner when a shared resource such as a load distribution apparatus is controlled. Accordingly, the time length consumed for the server control is determined depending on the number of servers to be controlled. In the conventional technique, the number of future requests is estimated by the time length corresponding to the determined control time. However, the time length to be estimated is changed depending on the prediction result, thereby degrading the prediction accuracy.

DISCLOSURE OF THE INVENTION

An object of the present invention is therefore to provide a resource-amount calculation system, a resource-amount calculation technique, and a resource-amount calculation program which are capable of calculating a combination of required server performance specification and required number of servers in the case where the number of accesses is unexpectedly increased or where a significant difference is involved between the monitoring result of the service level and the target value thereof.

The present invention provides, in a first aspect thereof, a resource-amount calculation system for calculating an available amount of server resources so as to allow a load distribution apparatus to distribute requests from clients, including: performance-information storage means for storing therein performance information representing server performance of each server; quantitative-model storage means for storing therein a quantitative model of each service representing a relationship among load per unit time applied from the clients, a response time of the each service that the each server provides, and the performance information; monitoring means for acquiring load per unit time at the present time applied on one or more executing servers that execute a specific service and a response time of the specific service at the present time; difference calculating means for calculating a difference between the load per unit time applied on the executing servers at the present time and load per unit time required for achieving a target response time, based on load per unit time at the present time and the response time acquired by the monitoring means, a previously specified target response time and performance information of the executing servers, by using the quantitative model corresponding to the specific service stored in the quantitative-model storage means; throughput calculating means for calculating a throughput representing load per unit time that one or more backup servers now in out of service are capable of serving within the target response time, based on the performance information of the backup servers and target response time, by using the quantitative model corresponding to the specific service stored in the quantitative-model storage means; server selection means for selecting an executing server or backup server having a throughput capable of cancelling the difference; and configuration changing means for performing a configuration change to cause the server selected by the server selection means to execute or stop the specific service and outputting information relating to the configuration change of the server to the load distribution apparatus.

The present invention provides, in a second aspect thereof, a resource-amount calculation system for calculating an available amount of server resources so as to allow a load distribution apparatus to distribute requests from clients, including: performance-information storage means for storing therein performance information representing server performance of each server; quantitative-model storage means for storing therein a quantitative model of each service representing a relationship among load per unit time applied from the clients, a response time of the each service that the each server provides, and performance information of each server; monitoring means for acquiring load per unit time at the present time applied on one or more executing servers that execute a specific service and a response time of the specific service at the present time; difference calculating means for calculating a difference representing an increase or decrease in a number of loads per unit time predicted at a time instant after a predetermined time has elapsed from the present time, based on the load per unit time and response time at the present time acquired by the monitoring means and past history of load per unit time stored; throughput calculating means for calculating a throughput representing load per unit time that one or more backup servers now in out of service are capable of serving within the response time at the present time, based on the performance information of the backup servers and the response time at the present time, by using the quantitative model corresponding to the specific service stored in the quantitative-model storage means; server selection means for selecting an executing server or backup server having a throughput capable of cancelling the difference; and configuration changing means for performing a configuration change to cause the server selected by the server selection means to execute or stop the specific service and outputting information relating to the configuration change of the server to the load distribution apparatus.

In the source-amount calculation system of the second aspect, the difference calculating means may further have a function of calculating, based on the load per unit time and response time at the present time acquired by the monitoring means, a previously specified target response time, performance information of the executing servers, a difference between the load per unit time applied on the executing server at the present time and load per unit time required for achieving the target response time, by using the quantitative model corresponding to the specific service stored in the quantitative-model storage means.

In the computer system of first and second aspects, the load per unit time is, for example, a number of requests per unit time.

The difference calculating means may calculate, based on a time-series target response time previously specified, a difference between load per unit time corresponding to a target response time at the present time and load per unit time corresponding to a target response time at a time instant after a predetermined time has elapsed from the present time.

If the difference is a positive value, the server selection means may select one or more backup servers having a combination throughput which is larger than and closest to the difference, whereas if the difference is a negative value, the server selection means may select one or more executing servers having a combination throughput which is smaller than and closest to the absolute value of the difference. If the difference is a positive value, the configuration changing means may perform a configuration change such that one or more backup servers selected by the server selection means execute the specific service, whereas if the difference is a negative value, the configuration changing means may perform a configuration change such that one or more executing servers selected by the server selection means stop the specific service.

The present invention provides, in a third aspect thereof, a resource amount calculation method for calculating an available amount of server resources so as to allow a load distribution apparatus to distribute requests from clients, including the steps of: storing performance information representing server performance of each server; storing a quantitative model of each service representing a relationship among load per unit time applied from the clients, a response time of the each service that the each server provides, and performance information; acquiring load per unit time at the present time applied on one or more executing servers that execute a specific service and a response time of the specific service at the present time; calculating a difference between the load per unit time applied on the executing servers at the present time and load per unit time required for achieving a target response time, based on load per unit time at the present time and the response time acquired by the monitoring step, a previously specified target response time and performance information of the executing server, by using the quantitative model corresponding to the specific service stored in the quantitative model storage means; calculating a throughput representing load per unit time that one or more backup servers now in out of service are capable of serving within the target response time, based on the performance information of the backup servers and target response time, by using the quantitative model corresponding to the specific service stored in the quantitative model storage means; selecting an executing server or backup server having a throughput capable of cancelling the difference; and performing a configuration change to cause the server selected by the server selection means to execute or stop the specific service and outputting information relating to the configuration change of the server to the load distribution apparatus.

The present invention provides, in a fourth aspect thereof, a resource amount calculation method for calculating an available amount of server resources so as to allow a load distribution apparatus to distribute requests from clients, including the steps of: storing performance information representing server performance of each server; storing therein a quantitative model of each service representing a relationship among load per unit time applied from the clients, a response time of the each service that the each server provides, and performance information; acquiring load per unit time at the present time applied on one or more executing servers that execute a specific service and a response time of the specific service at the present time; calculating a difference representing an increase or decrease in a number of loads per unit time predicted at a time instant after a predetermined time has elapsed from the present time, based on the load per unit time and response time at the present time acquired by the acquiring step and past history of load per unit time stored; calculating a throughput representing load per unit time that one or more backup servers now in out of service are capable of serving within the response time at the present time, based on the performance information of the backup servers and the response time at the present time, by using the quantitative model corresponding to the specific service stored in the quantitative-model storage means; selecting an executing server or backup server having a throughput capable of cancelling the difference; and performing, in configuration changing means, a configuration change to cause the server selected by the server selection means to execute or stop the specific service and outputting information relating to the configuration change of the server to the load distribution apparatus.

The resource amount calculation method of the fourth aspect may further include the step of: calculating a difference between the load per unit time applied on the executing servers and load per unit time at the present time required for achieving a previously specified target response time, based on the load per unit time and response time at the present time acquired by the acquiring step, the target response time, performance information of the executing servers, by using the quantitative model corresponding to the specific service stored in the quantitative-model storage means.

The configuration of the resource amount calculation method of the third and fourth aspects may be such that the quantitative mode storing means stores a number of requests per unit time as the load per unit time.

The present invention provides, in a fifth aspect thereof, a resource-amount calculation program mounted on a computer for calculating an available amount of server resources to be assigned to request from clients, the program allowing the computer to execute: a performance storing processing for storing performance information representing server performance of each server; a quantitative mode storing processing for storing a quantitative model of each service representing a relationship among load per unit time applied from the clients, a response time of the each service that the each server provides, and performance information; a monitoring processing for acquiring load per unit time at the present time applied on one or more executing servers that execute a specific service and a response time of the specific service at the present time; a difference calculating processing for calculating a difference between the load per unit time applied on the executing server at the present time and load per unit time required for achieving a previously specified target response time, based on the load per unit time and response time at the present time acquired by the monitoring step, the target response time and performance information of the executing server, by using the quantitative model corresponding to the specific service; a throughput calculating processing for calculating a throughput representing load per unit time that one or more backup servers now in out of service are capable of serving within the target response time, based on the performance information of the backup servers and the target response time, by using the quantitative model corresponding to the specific service; a server selecting processing for selecting an executing server or backup server having a throughput capable of cancelling the difference; and a configuration changing processing for performing a configuration change to cause the selected server to execute or stop the specific service and outputting information relating to the configuration change of the server to the load distribution apparatus.

The present invention provides, in a sixth aspect thereof, a resource-amount calculation program mounted on a computer for calculating an available amount of server resources to be assigned to request from clients, the program allowing the computer to execute: a performance-information storing processing for storing performance information representing server performance of each server; a quantitative model storing processing for storing a quantitative model of each service representing a relationship among load per unit time applied from the clients, a response time of the each service that each server provides, and the performance information; a monitoring processing for acquiring load per unit time at the present time applied on one or more executing servers that execute a specific service and a response time of the specific service at the present time; a difference predicting processing for calculating a difference representing an increase or decrease in a number of loads per unit time predicted at a time instant after a predetermined time has elapsed from the present time, based on the load per unit time and response time at the present acquired by the acquiring processing and past history of load per unit time stored; a throughput calculating processing for calculating a throughput representing load per unit time that one or more backup servers now in out of service are capable of serving within the target response time, based on the performance information of the backup servers and the response time at the present time, by using the quantitative model corresponding to the specific service stored; a server selecting processing for selecting an executing server or backup server having a throughput capable of cancelling the difference; and a configuration-change setting processing for performing a configuration change to cause the selected server to execute or stop the specific service and outputting information relating to the configuration change of the server to the load distribution apparatus.

The program of the sixth aspect of the present invention may further allow the computer to execute: a difference calculating processing for calculating a difference between the load per unit time applied on the executing server at the present time and load per unit time required for achieving a previously specified target response time, based on the load per unit time and response time at the present time acquired by the acquiring step, the target response time, performance information of the executing servers, by using the quantitative model corresponding to the specific service stored.

In the program of the sixth aspect of the present invention, the quantitative model storing processing may store a number of requests per unit time as the load per unit time.

The difference between the load per unit time corresponding to the target response time at the present time and the load per unit time required for achieving the target response time at a time instant after a predetermined time has elapsed may be calculated based on a time-series response time previously specified.

The configuration may be such that if the difference is a positive value, one or more backup servers having a combination throughput which is larger than and closest to the difference is selected, whereas if the difference is a negative value, one or more executing servers having a combination throughput which is smaller than and closest to the absolute value of the difference; and if the difference is a positive value, a configuration change is performed such that one or more backup servers selected by the server selection means execute the specific service, whereas if the difference is a negative value, a configuration change is performed such that one or more executing servers selected by the server selection means stop the specific service.

The necessary-server-resource-amount calculation system according to the present invention is used together with a monitoring means for monitoring servers provided with a management-targeted service and/or a provisioning means for performing a configuration change of shared pool servers to the service. If the system includes server selecting means, service-characteristic storage section, and resource-performance-specification storage section in order to maintain the service-level-targeted value, then the system also includes a response-time-difference calculation means.

Then, the server selection means selects a combination of servers which are capable of processing part of the throughput from a given change of throughput. The change of throughput received as an input may be a throughput change converted by response-time-difference calculation means from a difference between the monitored result of the response time and the target value by using a relationship stored in the service-characteristic storage means between the response time and the throughput, or may be a throughput change predicted from the monitored result of the response time.

For selecting a combination of servers which are capable of cancelling the change of throughput by using the server selecting means, the servers corresponding to the throughput change are determined based on the server performance of the pool servers stored in the resource-performance-specification storage section. By employing such a configuration, the object of the present invention can be achieved.

According to the present invention, it is possible to prevent the response time and server availability from decreasing when the service load is unexpectedly increased even in the case where there is a range of variation in the performance specification among management-targeted servers. The reason is that, according to the present invention, it is possible to suppress an increase in the number of requests or to select servers having number/performance, which meets the requirement for reduction of the difference between the target service-level value and service level at the present time.

Further, even when the service load is unexpectedly increased, the number of service requests at a more appropriate time can be predicted, thereby further reducing deterioration of the response time and reduction in the server availability. The reason is as follows. That is, in the present invention, when the server is selected, the number of servers as well as the performance specification of each server is taken into consideration, whereby the number of servers to be controlled in parallel can be stochastically reduced. This results in a reduction of the dispersion of the time length required for the change of configuration, and accordingly, it is possible to calculate in advance the future time instant at which the number of service requests is to be measured. Thus, it is possible to predict the number of service request adequately when the service load is increased.

BRIEF DESCRIPTION OF THE DRAWINGS

FIG. 2 is a table showing an example of performance-specification information;

FIG. 3 is a table showing an example of service information;

FIG. 4 is an explanatory view showing an example of model information;

FIG. 14 is a table showing an example of the service information;

DETAILED DESCRIPTION OF THE INVENTION

First Embodiment

Figure 1:
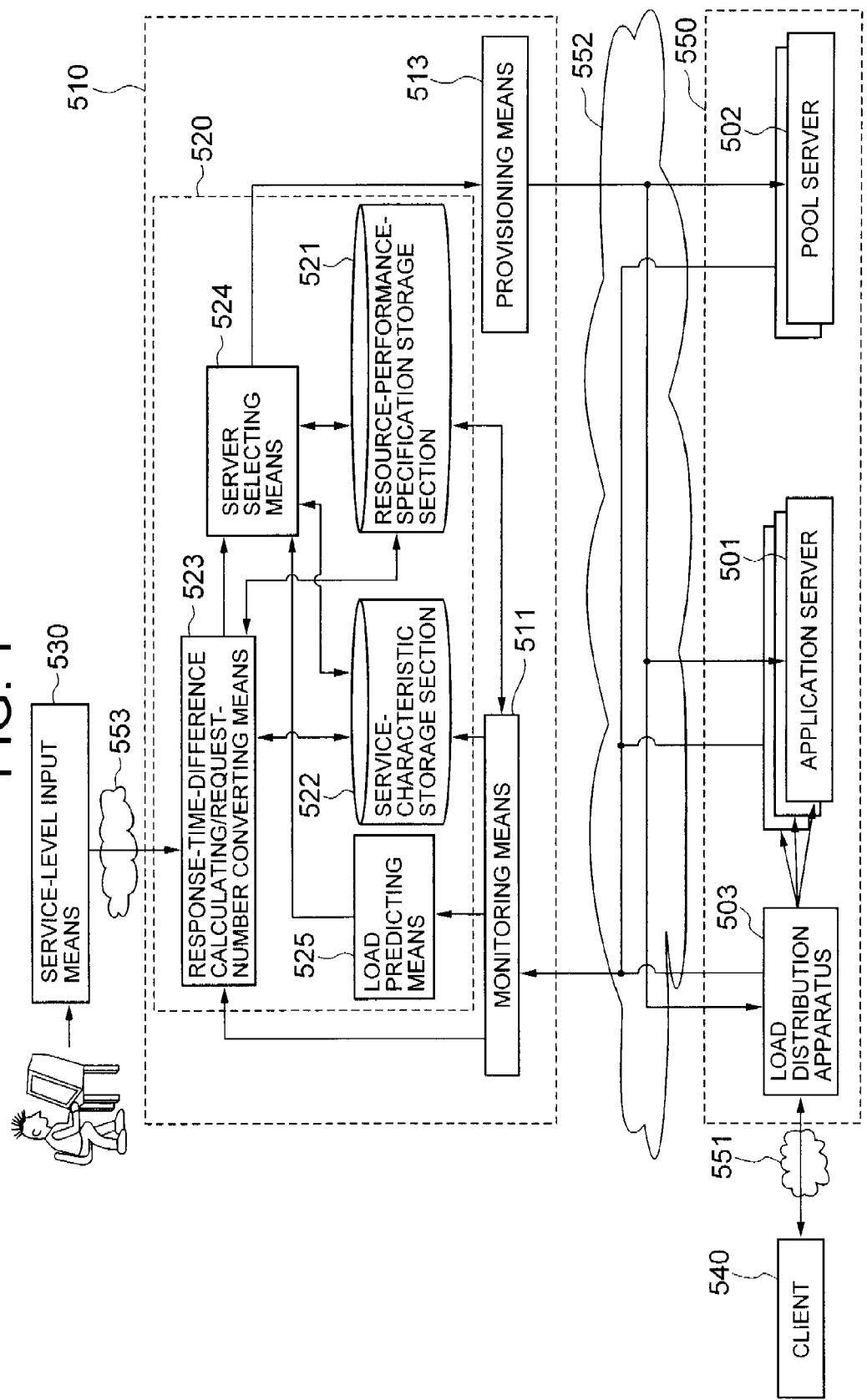
FIG. 1 is a block diagram showing a first embodiment of a server-resource management system according to the present invention.

A first embodiment of the present invention will be described below with reference to the accompanying drawings. FIG. 1 is a block diagram showing a first embodiment of the server-resource management system according to the present invention. The server-resource management system shown in FIG. 1 includes a management-targeted system 500, a management system 510 for managing the management-targeted system 500, and a service-level input means 530 for inputting the service level of a management-targeted service to the management system 510.

The management-targeted system 500 can communicate with a client 540 through a communication network 551 such as the Internet. The management system 510 is communicably connected to the management-targeted system 500 and service-level input means 530 through communication networks 552 and 553 such as the Internet.

The management-targeted system 500 includes application servers 501, pool servers 502, and a load distribution apparatus 503. The application servers 501 are each equipped with a service application and execute a service assigned by the load distribution apparatus 503. The pool servers 502 are not each used by a specific service application, and are shared among a plurality of services. The load distribution apparatus 503 distributes requests made to applications among the application servers.

The management system 510 includes a monitoring means 511 for monitoring the application servers 501, pool servers 502 and load distribution apparatus 503, a resource-capacity planning means 520 for calculating the number of servers required for maintaining the service quality, and a provisioning means 513 for providing a specific service application program in the pool server 502 shared among a plurality of services and executes configuration control such as registration of addresses of servers in the load distribution apparatus 503. In the case where the management system 510 is realized by a server apparatus, the monitoring means 511, resource-capacity planning means 520, and provisioning means 513 are realized when a CPU incorporated in the server apparatus executes a program which realizes these functions and is stored in a storage means such as an ROM.

The resource-capacity planning means 520 includes a load predicting means 525 for predicting load such as the number of future requests based on the past load characteristics, a response-time-difference calculation/request-number converting means (difference-amount calculation/throughput calculation means) 523, a service-characteristic storage section (quantitative-model storage means) 522, a resource-performance-specification storage section (performance-information storage means) 521, and a server selection means 524.

The resource-performance-specification storage section 521 stores in advance the performance-specification information shown in FIG. 2. The performance-specification information includes items of a resource ID for uniquely identifying the server resource such as an application server and pool server, a service assignment (service ID) indicating a service assigned to the server resource, and a performance specification (1 to n) of the server resource. The service assignment and performance specification are associated with the resource ID. The performance specification (1 to n) is one or more information indicating, e.g., CPU clock number, main memory capacity, and the like.

The service-characteristic storage section 522 stores in advance the service information and model information which indicate service characteristics. The service information shown in FIG. 3 includes service ID, quantitative model (model ID), coefficient, and constant. The model information exemplified in FIG. 4 includes a quantitative model representing the relationship among three states: performance specification of each server resource, throughput indicating the number of accesses per unit time entering into each server resource, and average response time corresponding to the number of accesses.

The response time is represented as a function of the performance specification and throughput. The relationship between the performance specification and the throughput is managed based on a quantitative model template and a coefficient vector of the model depending on the service. That is, the quantitative model corresponding to each service can be acquired from the service information of FIG. 3 and model information of FIG. 4. It is to be noted that the model information includes a quantitative model 802 and may further include, in accordance with the processing performed by the response-time-difference calculation/request-number conversion means 523, a quantitative model 803 obtained by partially differentiating the quantitative model 802 with respect to the throughput while the server performance specification is kept constant.

The monitoring means 511 monitors the application servers 501, acquires a response time indicating the response time per transaction for each management-targeted service assigned to each application server, and outputs the identifier of the monitoring application server 501 and monitored result of the response time to the response-time-difference calculation/request-number conversion means 523. Similarly, the monitoring means 511 acquires a throughput indicating the number of requests per unit time and outputs the same as a throughput monitoring result to the load predicting means 525.

The response-time-difference calculation/request-number conversion means 523 receives, as inputs, a target value of response time which is a value relating the management-targeted service and which is output by the service-level input means 530, monitored result of the response time that the monitoring means 511 acquires by monitoring a given application server 501 provided with a management-targeted service, and identifier of the monitor-targeted application server 501.

The response-time-difference calculation/request-number conversion means 523 searches the resource-performance-specification storage section 521 based on the identifier output by the monitoring means 511 and acquires corresponding performance-specification information. Thereafter, the response-time-difference calculation/request-number conversion means 523 calculates the change of throughput from the target value of response time, monitored result of the response time, performance-specification information, and service characteristics obtained from the service-characteristic storage section 522.

The change of throughput is a value indicating the throughput to be distributed to the pool servers for the purpose of achieving the target value of response time. As a calculation technique of the change of throughput, there exist two techniques: first technique is a technique that performs difference calculation first and then performs metric conversion from the response time into request number; and second technique is a technique that performs metric conversion from the response time into request number and then performs difference calculation.

The first calculation technique of the change of throughput performed by the response-time-difference calculation/request-number conversion means 523 will be described below in more detail. The response-time-difference calculation/request-number conversion means 523 first calculates the difference between the target value of response time and monitored result of the response time, to obtain the change of response time. Thereafter, the response-time-difference calculation/request-number conversion means 523 acquires the quantitative model 803 corresponding to the relevant service from the service-characteristic storage section 522. The quantitative model 803 is a numeric expression representing a change in the response time relative to the change of throughput. Thus, the response-time-difference calculation/request-number conversion means 523 assigns the change of response time, coefficients shown in FIG. 3, and server performance specification of the relevant server to the acquired quantitative model 803, to thereby acquire the change of throughput.

Next, the second calculation technique for the change of throughput will be described below. The response-time-difference calculation/request-number conversion means 523 takes out the quantitative model 802 corresponding to the relevant service from the service-characteristic storage section 522. Thereafter, the response-time-difference calculation/request-number conversion means 523 assigns, into the acquired quantitative model 802, coefficients and constant shown in FIG. 3, server performance specification of the relevant server, target value of response time, and monitored result of the response time, to obtain the throughputs for the target value of response time and monitored result of the response time. Subsequently, the response-time-difference calculation/request-number conversion means 523 calculates the difference between the throughput calculation results for the target value of response time and monitored result of the response time to thereby acquire the change of throughput.

The response-time-difference calculation/request-number conversion means 523 calculates the changes of throughput for all the application servers in the manner as described above, adds together the changes of throughput, and outputs the addition result to the server selection means 524. At the same time, the response-time-difference calculation/request-number conversion means 523 outputs the target value of response time received from the service-level input means 530. The monitored result of the response time may be used in place of the above target value of response time.

The load predicting means 525 predicts, based on the throughput monitoring result output by the monitoring means 511, an increase or decrease in the throughput at a time instant after a predetermined time has elapsed from the present time and outputs the same as the change of throughput to the server selection means 524. The predetermined time is e.g., a time required for the provisioning means 513 to complete the provisioning processing. The above calculation may be performed using a well-known time-series prediction technique such as an ARIMA model or a state space model based on the accumulated past history of the throughput. The load predicting means 525 passes the monitored result of the response time received from the monitoring means 511 to the server selection means 524 together with the change of throughput. The target value of response time may be used in place of the monitored result of the response time.

The server selection means 524 receives: the change of throughput and target value of response time output by the response-time-difference calculation/request-number conversion means 523 or change of throughput and monitored result of the response time output by the load predicting means 525; and performance characteristics of the monitored server. Thereafter, the server selection means 524 calculates the performance/number of servers corresponding to the received change of throughput and instructs the provisioning means 513 to perform control of the configuration change for the calculated servers.

Figures 5, 6:
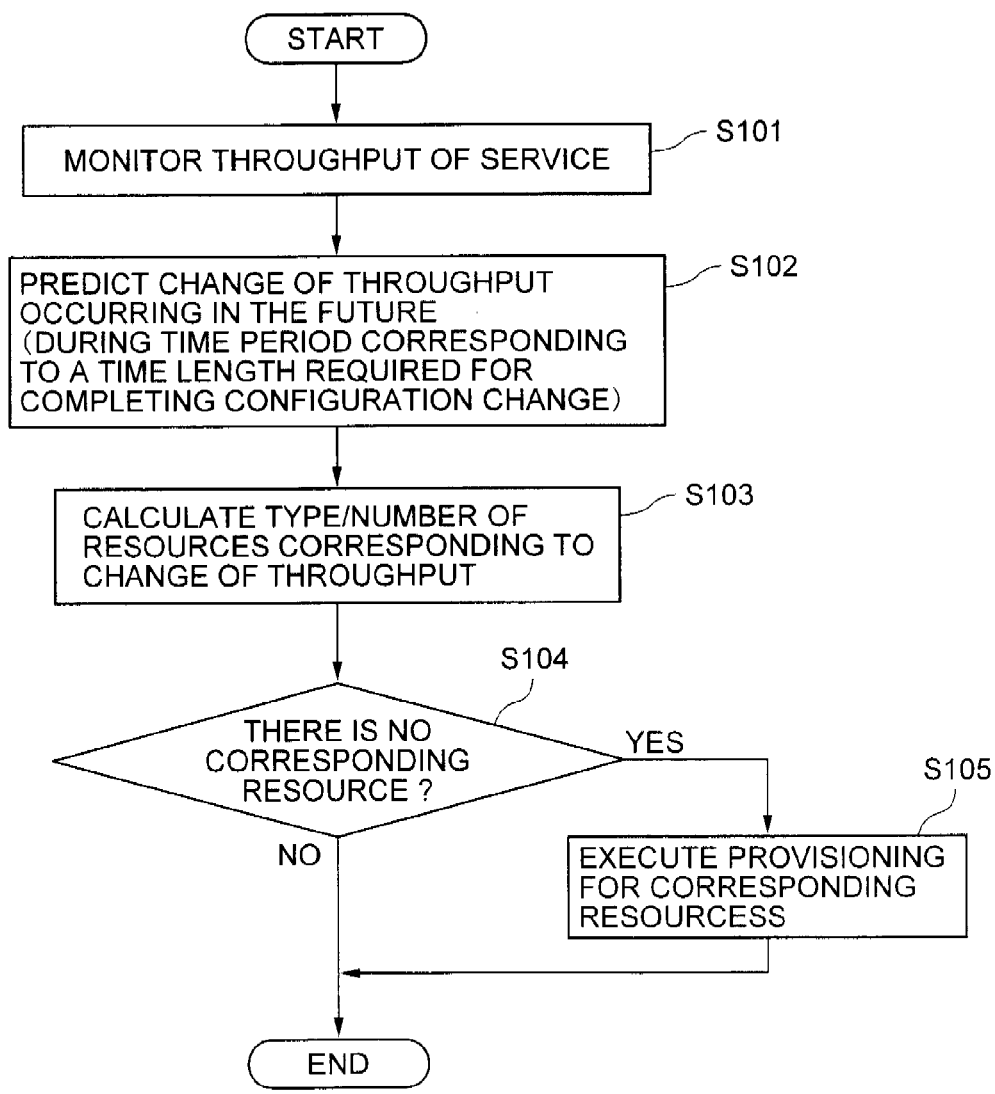
FIG. 5 is a view showing information for a server selection means to acquire a quantitative model showing the relationship between the performance specification and the throughput.
FIG. 6 is a flowchart of operation of the first embodiment in the case where the load predicting means calculates the change of a throughput.

FIG. 5 is a view used for describing the processing in which the server selection means 524 acquires a quantitative model showing a relationship between the performance specification and the throughput. FIG. 5 shows the information obtained in the case where the server selection means 524 has received the change of throughput and monitored result of the response time output by the load predicting means 525. An expression 901 configures an expression representing that the monitored result of the response time is assigned as the response time. An expression 902 configures an expression representing that the response time is a function of the throughput and server performance specification. The expression 902 configures, e.g., a quantitative model acquired from the service-characteristic storage section 522 and corresponds to the quantitative model 802 shown in FIG. 4. The server selection means 524 calculates a simultaneous equation 903 of the expressions 901 and 902 to thereby acquire a quantitative model representing the relationship between the performance specification and the throughput.

In the case where the server selection means 524 has received the change of throughput and target value of response time output by the response-time-difference calculation/request-number conversion means 523, the target value of response time is assigned as the response time.

The server selection means 524 sequentially assigns the performance specifications 1 to n included in the performance-specification information shown in FIG. 2 and calculates the throughput for each resource ID. It is assumed here that the server selection means 524 assigns the performance specifications 1 to n of the pool servers 502 for which the service assignment is "Pool". The server selection means 524 selects, from the calculated throughputs, a throughput which is larger than and closest to the output change of throughput and delivers a resource ID corresponding to the selected throughput.

The server selection means 524 may perform in advance the following conversion processing for the change of throughput used for the calculation of the performance/number of servers. That is, the conversion processing is a processing that adds together a component obtained by multiplying the received change of throughput by a specific proportionality coefficient, a component obtained by multiplying a component obtained by integrating the throughput along the time axis by a specific proportionality coefficient, and a component obtained by multiplying a component obtained by differentiating the throughput along the time axis by a specific proportionality coefficient. By performing the above conversion processing, it is possible to prevent the control from oscillating, to thereby achieve a stable operation and reduce the convergence time length for the control.

The provisioning means 513 changes the configuration so that a pool server 502 having the resource ID output from the server selection means 524 functions as an application server.

Figure 7:
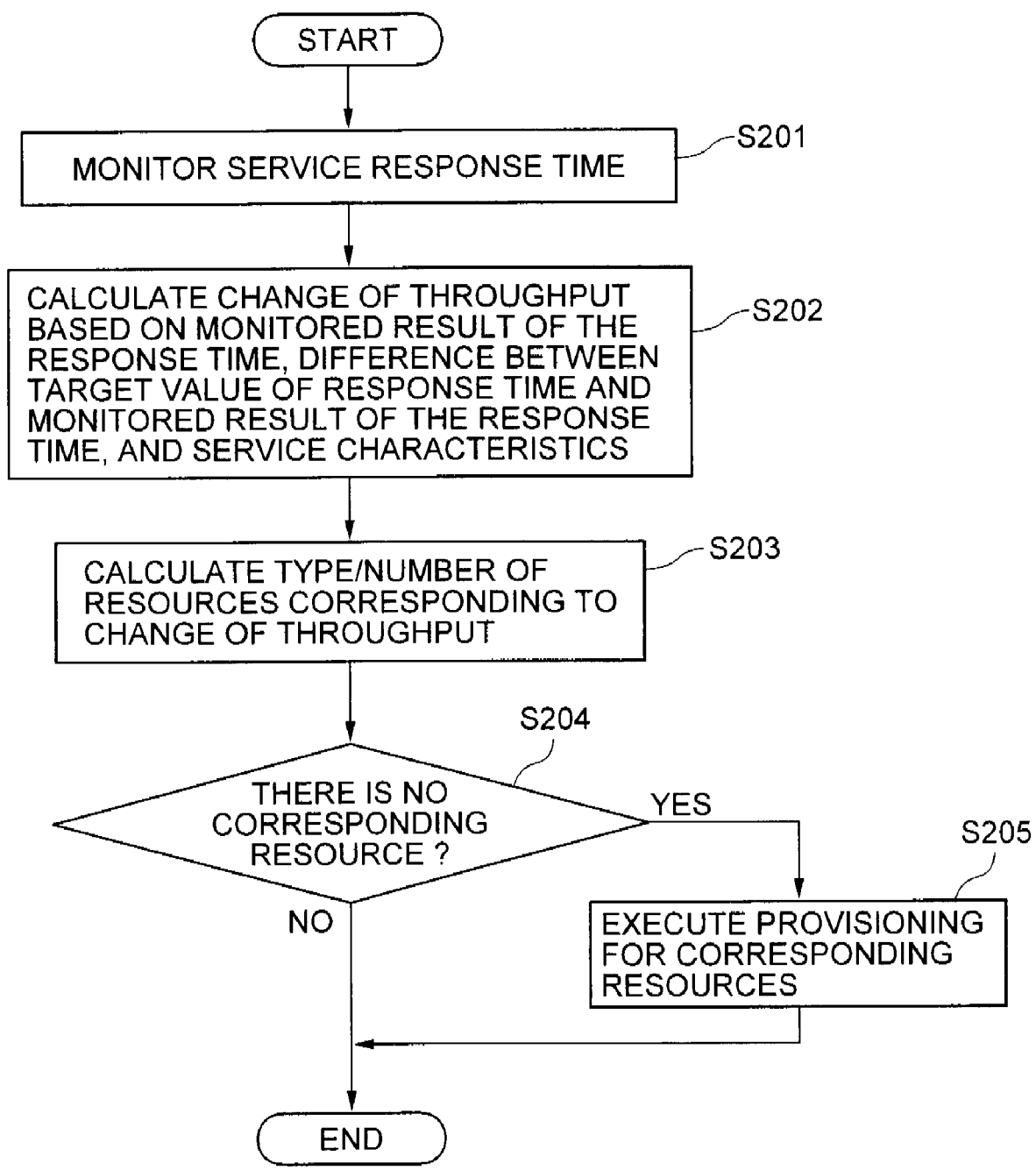
FIG. 7 is a flowchart of operation of the first embodiment in the case where the response-time-difference calculation/request-number-conversion means calculates the change of throughput.

Operation of the first embodiment will next be described with reference to the drawings. Hereinafter, the cases are separately described where the change of throughput is calculated by the load predicting means 525 and where the change of throughput is calculated by the response-time-difference calculation/request-number conversion means 523. FIGS. 6 and 7 are a flowchart showing operations of the first embodiment in the cases where the load predicting means 525 and response-time-difference calculation/request-number conversion means 523, respectively, calculate the change of throughput.

As the first overall operation, operation of the present embodiment will be described with reference to FIG. 6 in the case where the load predicting means 525 calculates the change of throughput. The monitoring means 511 monitors the application server 501 relating to a management-targeted service, i.e., monitors the throughput which is the number of requests per unit time for the service (step S101). The monitoring means 511 may acquire the throughput by monitoring the load distribution apparatus 503.

The load predicting means 525 predicts the change of throughput occurring during the time length required for the provisioning means 513 to complete a provisioning processing based on the throughput monitoring result (step S102).

The server selection means 524 calculates the type/number of resources corresponding to the change of throughput (step S103). The server selection means 524 determines whether there is no server resource corresponding to the change of throughput (step S104). In the case where there is no corresponding server resource (NO), the server selection means 524 ends this processing flow; while in the case where there is any corresponding resource (YES), the provisioning means 513 executes a configuration change for the server resources corresponding to the result obtained in step S103 (step S105).

Figure 8:
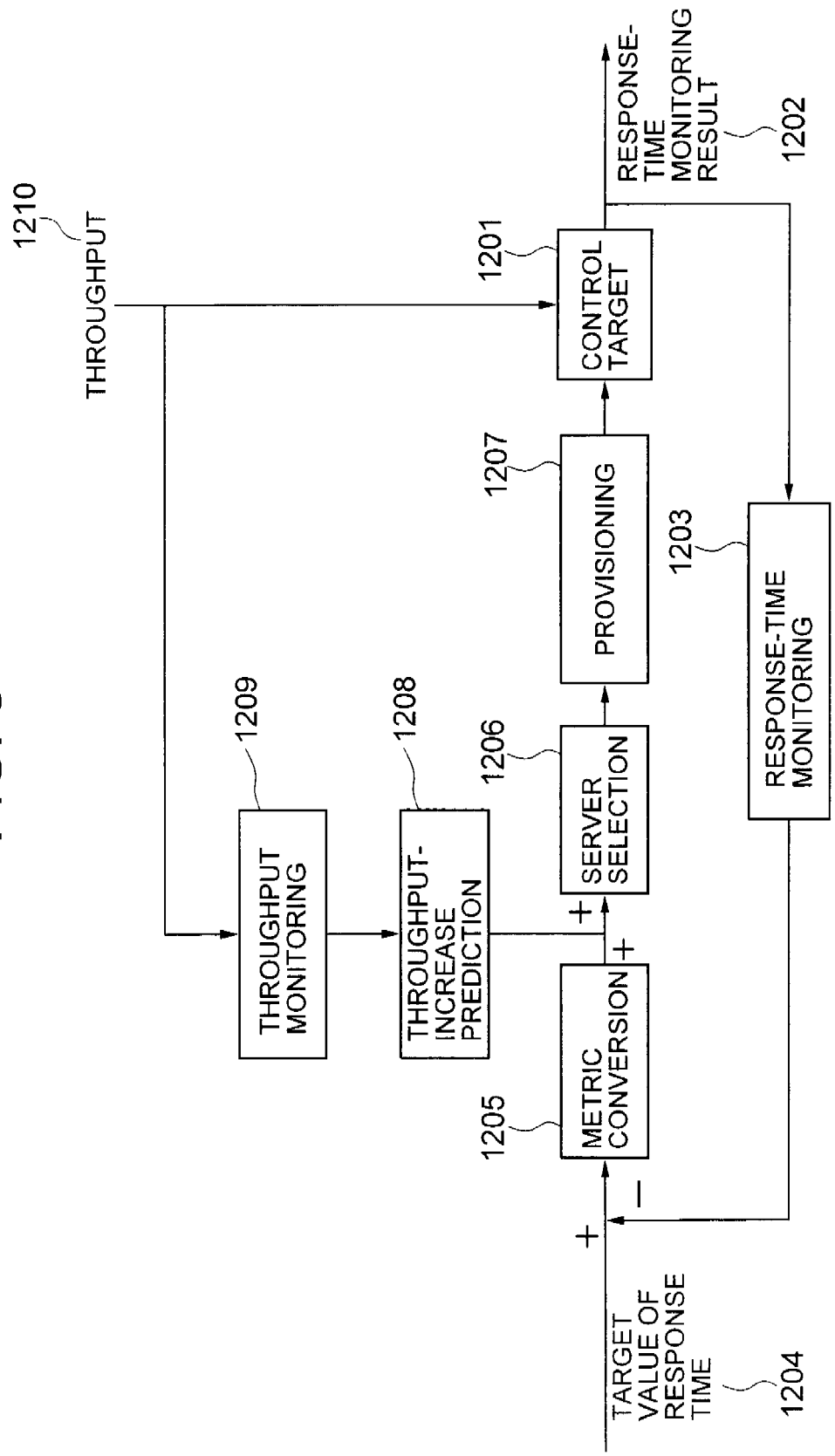
FIG. 8 is a block diagram showing the flow of a signal transfer in the first embodiment.

FIG. 8 is a block diagram showing the flow of a signal transfer in the first embodiment. The throughput 1210, target value of response time 1204, and response-time control result 1202 are signals to be transmitted. A throughput monitoring 1209 and a response time monitoring 1203 are functions realized by the monitoring means 511 of FIG. 1. A throughput-increase prediction 1208 is a function realized by the load predicting means 525. A difference calculation and a metric conversion 1205 of the monitored result of the response time and target value of response time 1204 are functions realized by the response-time-difference calculation/request-number conversion means 523. A server selection 1206 is a function realized by the server selection means 524. A provisioning 1207 is a function realized by the provisioning means 513. A control target 1201 is a function realized by the application server 501 and pool server 502.

The processing from step S101 to step S105 is represented in the block diagram shown in FIG. 8 as follows: the throughput monitoring 1209 monitors the throughput 1210; the throughput-increase prediction 1208 uses the monitoring result of the throughput monitoring 1209 to calculate an increase in the throughput; the server selection 1206 selects a combination of servers having performance specifications capable of cancelling the increase in the throughput; and the provisioning 1207 executes provisioning processing.

Next, as the second overall operation, operation of the present embodiment will be described with reference to FIG. 7 in the case where the response-time-difference calculation/request-number conversion means 523 calculates the change of throughput. The monitoring means 511 monitors the application server 501 relating to a management-targeted service, i.e., monitors the response time of the service (step S201). The monitoring means 511 may acquire the throughput by monitoring the load distribution apparatus 503. The monitoring means 511 may acquire the response time by monitoring the load distribution apparatus 503.

The response-time-difference calculation/request-number conversion means 523 of the resource-capacity planning means 520 calculates the change of throughput based on the monitoring result of the response time, target value of response time input from the service-level input means 530, service characteristics of the target service previously stored in the service-characteristic storage section 522, and performance-specification information of each of the application servers 501 (step S202). As described above, as a calculation technique for the change of throughput, there exist the first technique that performs difference calculation and then performs metric conversion from the response time into a request number, and second technique that performs metric conversion from the response time into the request number and then performs difference calculation.

The server selection means 524 calculates the type/number of resources corresponding to the change of throughput (step S203). The server selection means 524 determines whether there is no server resource corresponding to the change of throughput (step S204). In the case where there is no corresponding resource (NO), the server selection means 524 ends this processing flow; while in the case where there is any corresponding resource (YES), the provisioning means 513 executes a configuration change for the server resources corresponding to the result obtained in step S203 (step S205).

The processing from step S201 to step S205 is represented in the block diagram shown in FIG. 8 as follows: the response time monitoring 1203 monitors the response time of the control target 1201; the metric conversion 1205 calculates a difference between the monitored result of the response time and target value of response time 1204 and converts the calculation result into a change in the throughput; the server selection 1206 selects a combination of servers having performance specifications corresponding to the change of throughput; and the provisioning 1207 executes provisioning processing.

The operation performed in the case where the load predicting means 525 calculates the change of throughput corresponds to a feedforward control. The feedforward control is a control system that predicts an external action (disturbance) which may affect the operation of a control target system and performs control so as to cancel the disturbance to maintain the control target in a stable state. In the case of the present embodiment, the increase in the throughput or the like corresponds to the disturbance, and an optimal pool server to which the predicted change of throughput is distributed is selected. With the feedforward control system, it is possible to cope with an unexpected disturbance before it significantly affects the operation of the system.

The operation performed in the case where the response-time-difference calculation/request-number conversion means 523 calculates the change of throughput corresponds to a feedback control. The feedback control is a control system that performs control so as to bring the state of a control target close to a targeted state. In the case of the present embodiment, an optimal pool server is selected to which the predicted change of throughput, which is a difference between the target state and the actual state, is distributed. With the feedback control system, it is possible to bring a control target close to yhr target state. The load predicting means 525 and response-time-difference calculation/request-number conversion means 523 may be used singularly or in combination.

Next, operation of the resource-capacity planning means 520 will be described. The operation of the resource-capacity planning means 520 is divided into two stages: main processing and preprocessing. The main processing is a processing performed by the server selection means 524, in which it receives, as inputs, the change of throughput and response time. The preprocessing corresponds to a processing performed by the load predicting means 525 in the case of the first overall operation, and corresponds to a processing performed by the response-time-difference calculation/request-number conversion means 523 in the case of the second overall operation. In the second overall operation, the difference calculation between the monitoring result and the target value and metric conversion from the response time into the number of requests are performed.

Figure 9:
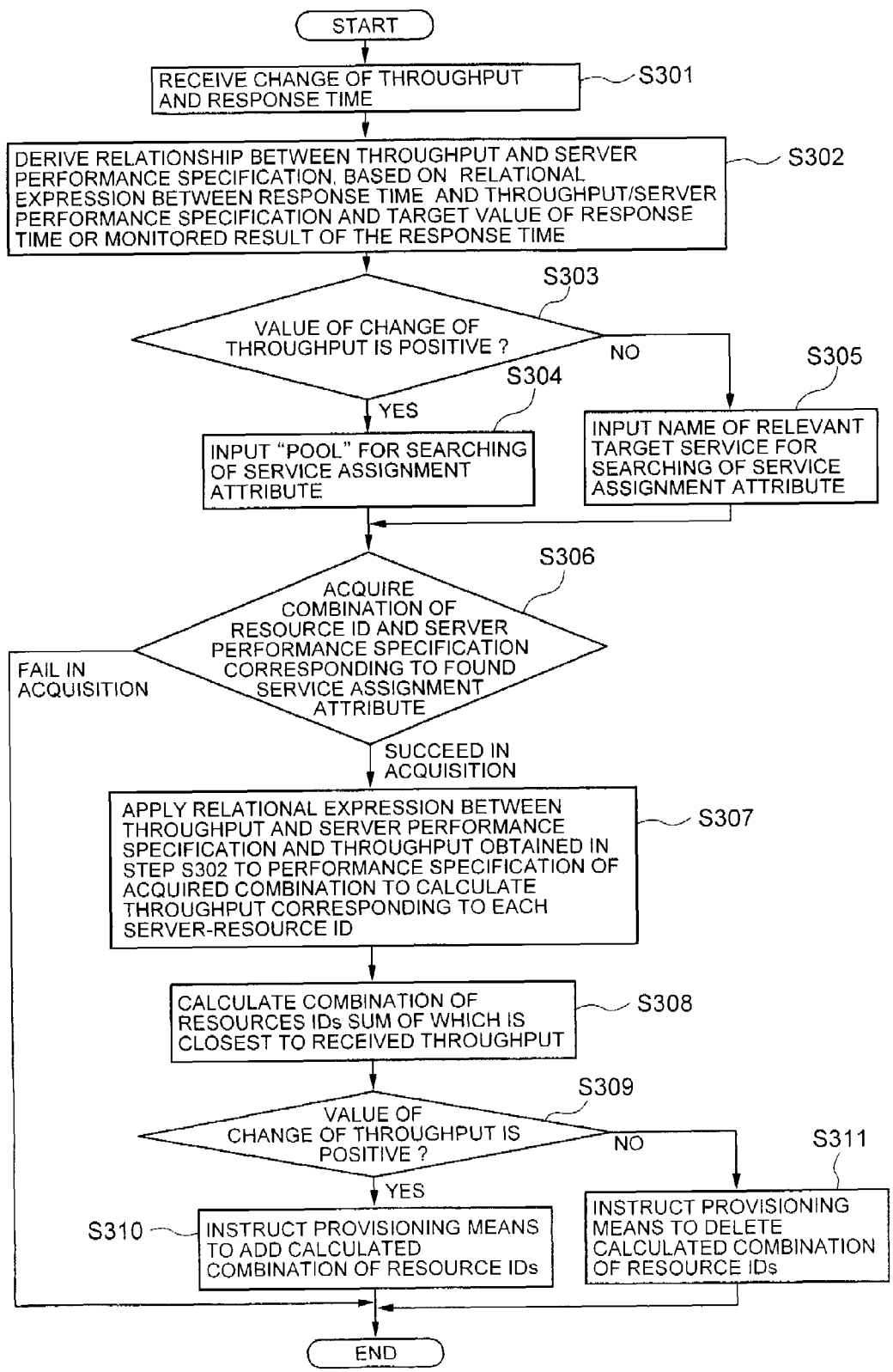
FIG. 9 is a flowchart showing operation of the server selection means.

FIG. 9 is a flowchart showing operation of the server selection means 524. Hereinafter, a case where the processing of the load predicting means 525 is performed as the preprocessing will be described. Upon receiving the change of throughput and monitored result of the response time from the load predicting means 525 (step S301), the server selection means 524 acquires, from the service-characteristic storage section 522, the quantitative model 902 (see FIG. 5) relating to the management-targeted service and sets up the simultaneous equation 903 (see FIG. 5) of the quantitative model 902 and monitored result of the response time 901 (see FIG. 5). The quantitative model 902 configures, e.g., the quantitative model 802 shown in FIG. 4. The simultaneous equation 903 can be constructed since the load distribution apparatus 503 to be managed is allowed to operate in a weighted round robin. By solving the simultaneous equation 903, it is possible to derive a relationship between the server performance specification and the throughput (step S302).

In the case where the processing of the response-time-difference calculation/request-number conversion means 523 is performed as the preprocessing, the server selection means 524 receives, in step S301, the change of throughput and target value of response time from the response-time-difference calculation/request-number conversion means 523 and sets up a simultaneous expression of the quantitative model 902 and target value of response time.

Thereafter, the server selection means 524 determines whether the value of the change of throughput received in step S301 is positive or negative (step S303). If the change of throughput is positive (YES), the server selection means 524 searches the resource-performance-specification storage section 521 for a resource in which the service assignment of the performance-specification information is "Pool" (step S304) whereas if the change of throughput is negative (NO), the server selection means 524 searches for a resource in which the service assignment of the performance-specification information indicates the name of the relevant target service (step S305) and, then, acquires a combination of the resource ID and performance specification of the corresponding resource (step S306).

If the server selection means 524 has succeeded in acquiring the combination of the resource ID and performance specification in step S306, the flow advances to step S307; whereas if failed, this flow is ended. In step S307, the server selection means 524 applies the relational expression between the server performance specification and the throughput obtained from the abovementioned simultaneous equation 309 to the acquired combination of the resource ID and the performance specification of a server, to thereby calculate a throughput corresponding to each server-resource ID (step S307).

The server selection means 524 uses the combination of the resource ID and throughput to calculate a combination of server-resource ID corresponding to the change of throughput received as an input (step S308). For example, if the change of throughput is positive, the server selection means 524 may calculate a combination of throughputs the sum of which is larger than and closest to the change of throughput; whereas if the change of throughput is negative, the server selection means 524 may calculate a combination of throughputs the sum of which is smaller than and closest to the absolute value of the change of throughput.

Finally, the server selection means 524 determines whether the change of throughput is positive or negative (step S309). If the change of throughput is positive (YES), the server selection means 524 instruct the provisioning means to perform addition of the combination of the server-resource IDs (step S310) whereas if the change of throughput is negative (NO), the server selection means 524 instructs the provisioning means to perform deletion of the combination of the server-resource IDs (step S311) and, then, this flow is ended. The "addition" indicates configuration change in which the pool server is switched to the application server, and "deletion" indicates configuration change in which the application server is switched to the pool server.

Figure 10:
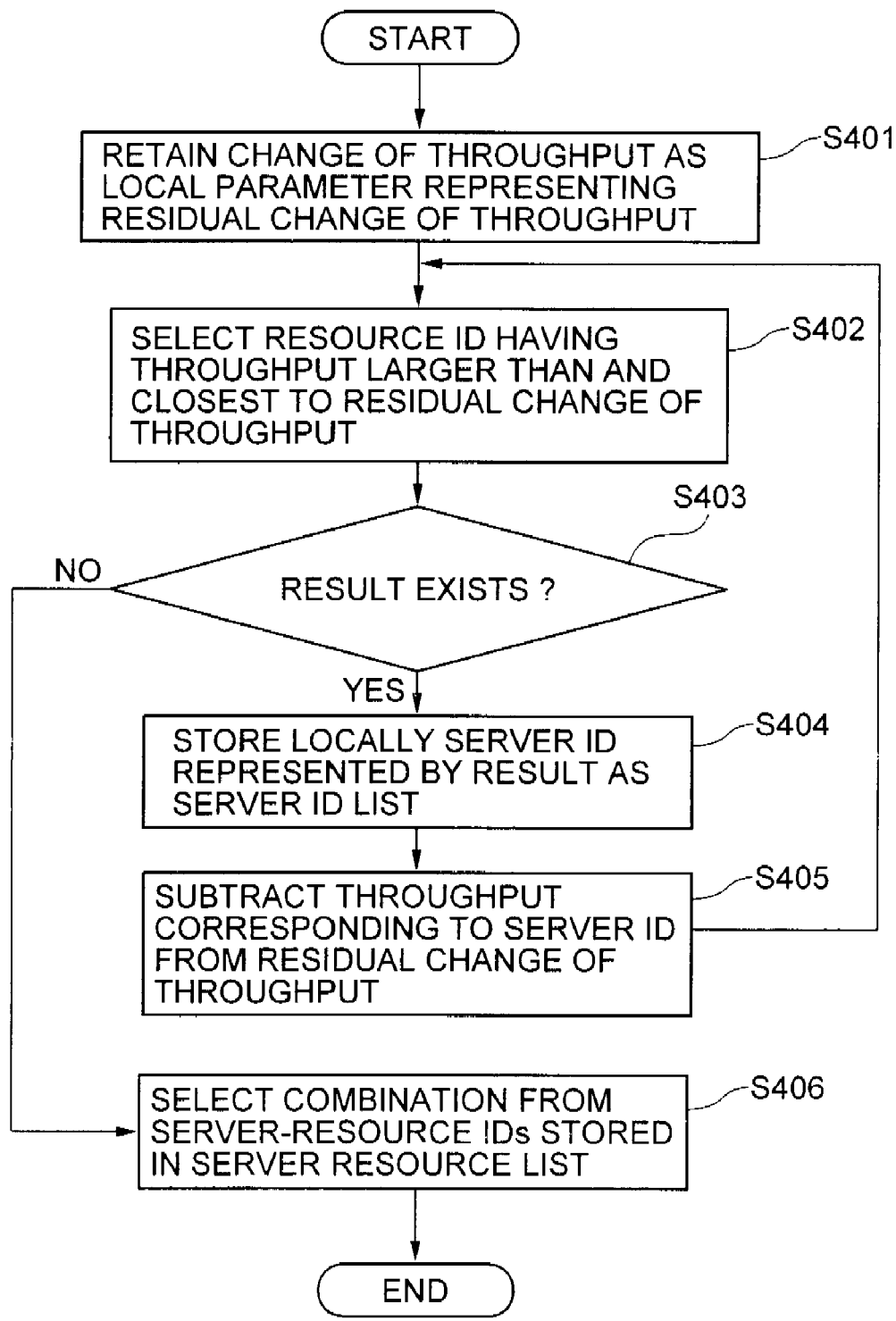
FIG. 10 is a flowchart showing operation of a server selection means.

The technique of calculating a combination in step S308 of FIG. 9 may be realized by, e.g., steps shown in the flowchart of FIG. 10. First, the server selection means 524 stores the received change of throughput as a local parameter representing residual change of throughput (step S401) and selects a server-resource ID having a throughput larger than and closest to this remaining change of throughput (step S402).

The server selection means 524 determines whether or not a result exists (step S403). If a result exists (YES), the server selection means 524 retains the corresponding server-resource ID in a local parameter representing the server ID list (step S404). Further, the server selection means 524 subtracts the throughput corresponding to the server-resource ID represented by the existing result from the residual change of throughput (step S405) and performs once again the processing of step S402. If the search result does not exist, the server selection means 524 selects a combination from the server-resource IDs existing in the server-resource ID list (step S406).

Figure 11:
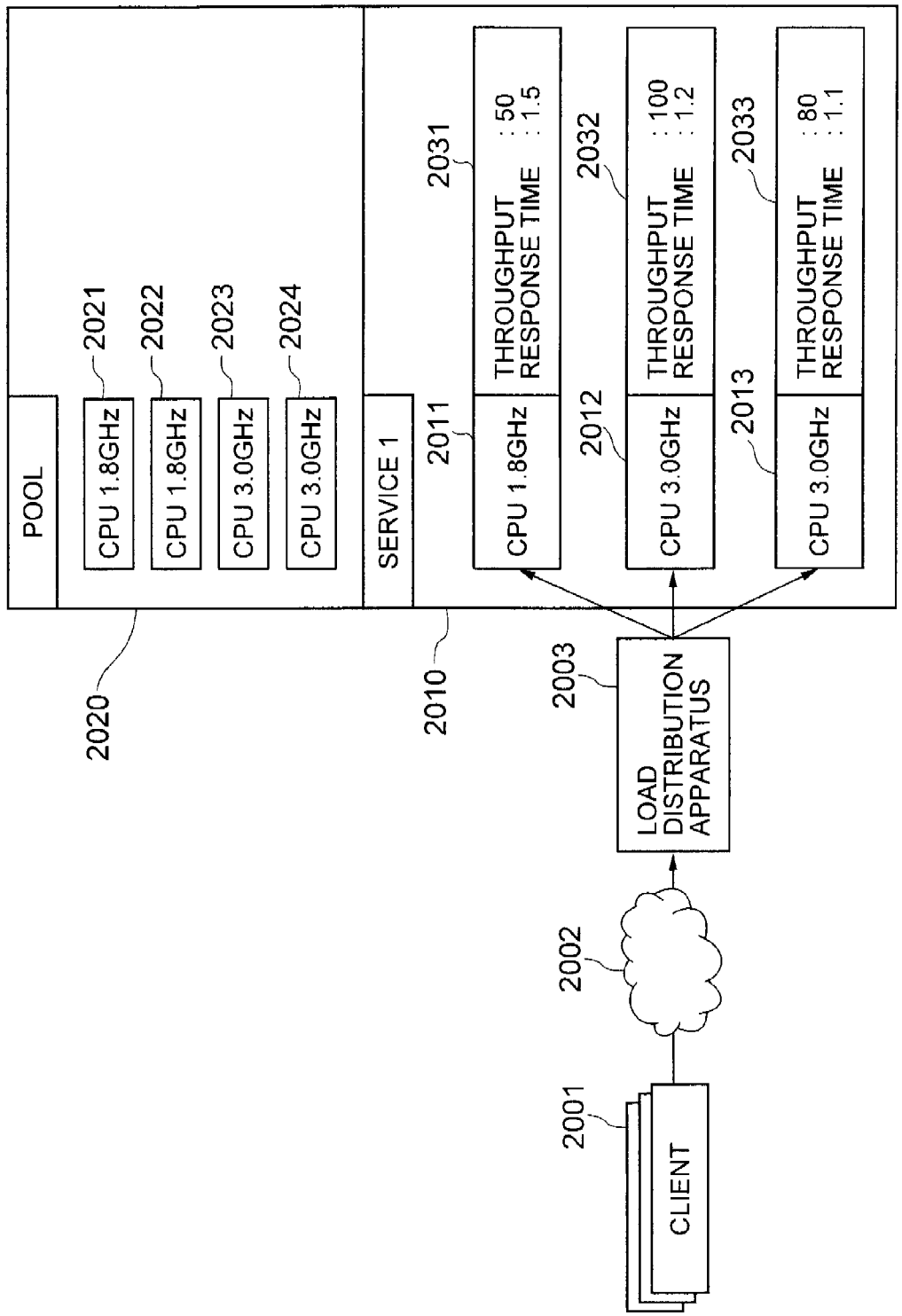
FIG. 11 is a block diagram showing an example of the configuration the management-targeted system.

Next, the operation of the first embodiment will be described using a concrete example. FIG. 11 is a block diagram showing an example of the configuration of the management-targeted system. The management-targeted system shown in FIG. 11 includes a load distribution apparatus 2003, a cluster 2010 including a plurality of servers providing "service-1" as a specific service, and a pool-server domain 2020 configured not to provide a specific service. The load distribution apparatus 2003 is communicably connected to a client 2001 through a network 2002.

The pool-server domain 2020 includes a high-performance servers 2023, 2024 and low-performance servers 2021, 2022. The cluster 2010 providing the service-1 includes two high-performance servers 2012, 2013 and one low-performance server 2011. Information representing a value of the throughput or response time of the servers 2011 to 2013 at a given time instant are referred to as "server states 2031 to 2033". The server states 2031 to 2033 are information acquired by the monitoring means 511.

Figures 12, 13:
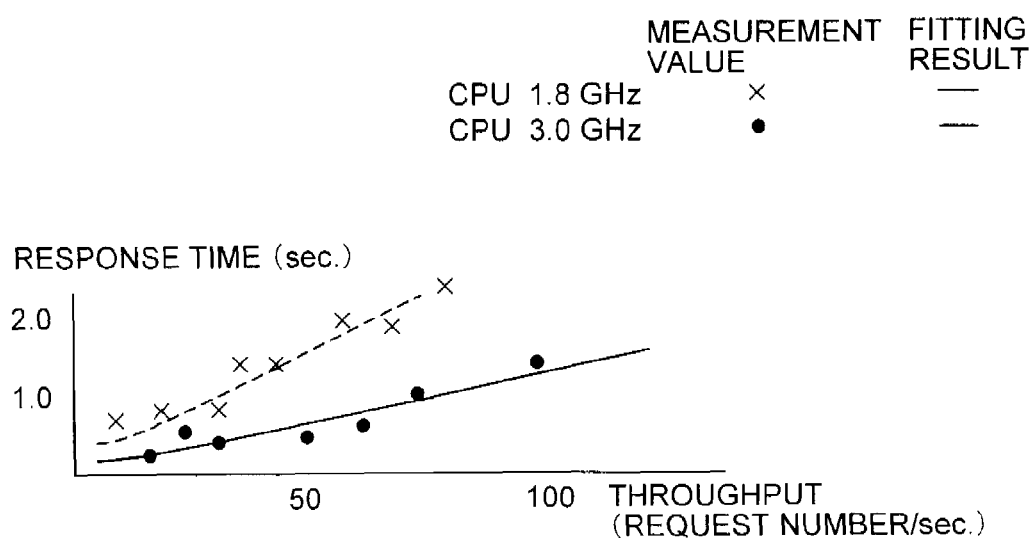
FIG. 12 is a table showing an example of the performance-specification information of the cluster and pool-server domain.
FIG. 13 is a graph showing characteristics of a state of a server.

FIG. 12 is an explanatory view showing performance-specification information of the cluster 2010 and pool-server domain 2020 stored in the resource-performance-specification storage section 521. The performance-specification information shown in FIG. 12 includes items of a resource ID, a service assignment, and a performance specification (CPU clock number).

The server states 2031 to 2033 of the servers 2011 to 2013 are collected by the monitoring means 511. Further, a calculation result of coefficients or a constant value of the quantitative model obtained by applying a regression analysis processing based on the history information of the server state is stored in the service-characteristic storage section 522. It is assumed, for example, that past server states 2031 to 2033 collected from the servers 2011 to 2013 are classified in terms of the performance specification (in this case, CPU clock number) of the server resource. In this case, assuming that the server state has characteristics represented by a graph shown in FIG. 13, service information shown in FIG. 14 is stored in the service-characteristic storage section 522. A quantitative model 2302 included in the service information shown in FIG. 14 corresponds to the quantitative model 802 included in the model information shown in FIG. 4.

It is assumed that a target value of response time of 1.0 sec. is fed from the service-level input means 530 to the response-time-difference calculation/request-number conversion means 523. Note that, in the present example, the response-time-difference calculation/request-number conversion means 523 calculates the change of throughput.

It is assumed here that the monitoring means 511 monitors the management-targeted servers 2011 to 2013 at the time instant when they are in the states represented by the server states 2031 to 2033, respectively.

When adopting the technique in which a difference calculation of the response time is performed and then conversion into the throughput is made, the response-time-difference calculation/request-number conversion means 523 takes out the partial differential equation of the quantitative model 803 of FIG. 4. First, in the difference calculation, 0.5 sec., 0.2 sec., and 0.1 sec. are calculated as the difference of the target value of response time and monitored result of the response time, i.e., a change in the response time of the management-targeted servers 2011 to 2013, respectively.

Thereafter, a change in the response time relative to the change of throughput is calculated by assigning the performance specification included in the performance-specification information shown in FIG. 12 and coefficients included in the service information shown in FIG. 14 to the quantitative model 803. In this case, 0.018, 0.0096, and 0.0096 are calculated for the management-targeted servers 2011 to 2013, respectively.

For example, in the case of the management-targeted server 2011, the change in the response time relative to the change of throughput is calculated as follows. The service-1 is assigned to the management-targeted server 2011, and the quantitative model thereof is model-1. Thus, the quantitative model 803 can be represented as d(response time)/d(throughput)=(coefficient−1)+(coefficient−2)×(CPU clock number). Thereafter, the performance specification included in the performance-specification information shown in FIG. 12 and coefficients included in the service information shown in FIG. 14 are assigned to the quantitative model 803. The performance specification (CPU clock number) of the management-targeted server 2011 is 1.8, coefficient−1 thereof is 0.030, and coefficient−2 thereof is −0.0068. As a result, 0.018 (=d(response time)/d(throughput)=0.030−0.0068×1.8) can be obtained.

By assigning the change in the response time "d(response time)" to the expression calculating the d(response time)/d(throughput), the change of throughput "d(throughput)" can be obtained. In this case, 28, 21, and 10 are calculated for the management-targeted servers 2011 to 2013, respectively. For example, in the case of the management-targeted server 2011, the change of throughput is calculated as follows. From d(response time)/d(throughput)=0.018, d(throughput)=d(response time)/0.018 is satisfied. The d(response time) is a change in the response time, and accordingly, by assigning 0.5 to the above expression, 28 (=d(throughput)=0.5/0.018) can be obtained.

When the values of the change of throughputs of the respective application servers in the manner as described above are summed up, 59 (=28+21+10) can be obtained. This value is passed to the server selection means 524 as the change of throughput.

Thereafter, the server selection means 524 selects a combination of servers having performance specifications capable of reducing the calculated change of throughput "59". Here, the server selection means 524 also is assumed to receive the target value of response time "1.0".

First, when the target value of response time "1.0" and coefficients and constant included in the service information shown in FIG. 14 are assigned to the quantitative model 802 shown in FIG. 4, a relational expression between the throughput and the server performance specification can be obtained. Since the change of throughput "59" is a positive value, the server selection means 524 selects a resource in which the service assignment of the performance-specification information is "Pool" from the performance-specification information shown in FIG. 12. In this case, the server 2021, server 2022, server 2023, and server 2024 are selected.

The performance specifications of the selected resource ID are input to the quantitative model 802. As a result, 22, 22, 82, and 82 can be obtained as the throughputs corresponding to the above respective servers.

For example, the throughput of the server 2021 is calculated as follows. Since a server to which the service-1 is newly assigned needs to be calculated, the quantitative model 802 is defined as response time=(coefficient−1)×(throughput)+(coefficient−2)×(throughput)×(CPU clock number)+(coefficient−3)×(CPU clock number)+(constant). When the target value of response time is 1.0, coefficient−1 is 0.030, coefficient−2 is −0.0068, coefficient−3 is −0.33, and constant is 1.20 (see FIG. 14) are assigned to the quantitative model 802:

$$1.0=0.030\times(\text{throughput})-0.0068\times(\text{throughput})\times(\text{CPU clock number})-0.33\times(\text{CPU clock number})+1.20$$

can be obtained as a relational expression between the throughput and server performance specification.

Since the performance specification (CPU clock number) of the server 2021 is 1.8 (see FIG. 12), the above relational expression is represented as:

$$1.0=0.030\times(\text{throughput})-0.0068\times(\text{throughput})\times1.8-0.33\times1.8+1.20.$$

As a result, 22 can be obtained as the throughput.

Here, as the throughput value, 44 is obtained by a combination of the servers 2021 and 2022, and 82 is obtained by the server 2023 or server 2024 by itself. Of these, a value larger than and closest to the change of throughput "59" is 82, whereby the server 2023 or server 2024 is selected as a control target server. Further, since the change of throughput is positive, processing to be performed as the configuration change is addition control in which the pool server is switched to the application server.

The above example shows the first overall operation. In the second overall operation, a control loop using the load predicting means 525 is formed. Assuming that the time required for the provisioning means 513 completes the configuration change in which the pool server 502 is switched to the application server 501 is one minute, the load predicting means 525 predicts an increase in the throughput entering into an application server providing the service-1 at a time instant after one minute has elapsed from the present time based on the past history.

Assuming that the state shown in FIG. 11 is set, the throughput 230 (=50+100+80) which is the sum of the throughputs of the management-targeted servers 2011 to 2013 are entering into the cluster 2010 and processed therein. Here, assume that the load predicting means 525 predicts, based on the past history, that the throughput is increased to 300 at a time instant after one minute has elapsed from the present time. This means that 70 (=300−230) is predicted as the change of throughput. It is assumed, at this time, that the average value of the response times 1.3 of respective servers shown in FIG. 11 is also input to the server selection means 524.

When the response time average value 1.3 and parameter values of the coefficients and constant shown in FIG. 14 are assigned to the quantitative model 802 shown in FIG. 14, a relational expression between the throughput and server performance specification can be obtained.

Thereafter, since the change of throughput is positive, a resource in which the server assignment is "Pool" is searched for from the performance-specification information shown in FIG. 12 and, consequently, the servers 2021, 2022, 2023, and 2024 are selected. By respectively assigning the server performance specifications of the servers to the abovementioned relational expression between the throughput and the server performance specification, 39, 39, 110, and 110 can be obtained as the throughputs of the respective servers.

For example, the throughput of the server 2021 is calculated as follows. Since a server to which the service-1 is newly assigned needs to be calculated, the quantitative model 802 is defined as response time=(coefficient−1)×(throughput)+(coefficient−2)×(throughput)×(CPU clock number)+(coefficient−3)×(CPU clock number)+(constant). When the target value of response time is 1.3, coefficient−1 is 0.030, coefficient−2 is −0.0068, coefficient−3 is −0.03, and constant is 1.20 (see FIG. 14) are assigned to the quantitative model 802, the following result:

$$1.3=0.030\times(\text{throughput})-0.0068\times(\text{throughput})\times(\text{CPU clock number})-0.33\times(\text{CPU clock number})+1.20$$

can be obtained as a relational expression between the throughput and server performance specification.

Since the performance (CPU clock number) of the server 2021 is 1.8 (see FIG. 12), the above relational expression is represented as:

$$1.3=0.030\times(\text{throughput})-0.0068\times(\text{throughput})\times1.8-0.33\times1.8+1.20.$$

As a result, 39 can be obtained as the throughput.

Of the combinations of the throughput values calculated, a value larger than and closest to the predicted change of throughput "70" is 78 which is a combination of the throughputs of the servers 2021 and 2022, whereby the servers 2021 and 2022 are selected as control target servers. Further, since the change of throughput is positive, processing to be performed as the configuration change of the selected servers is the addition control.

As described above, according to the first embodiment, it is possible to control the management-targeted load distribution apparatus to operate so as to distribute requests from users between a plurality of servers using a weighted round-robin algorithm. Further, the management system can calculate a combination of servers having performance specifications capable of cancelling the change in the throughputs of the servers from the relational expression between the response time and the throughput/server performance specification, performance specification of each server, and change of throughput calculated from the monitored value of the server response time and target value of throughput or predicted change of throughput. Therefore, it is possible to adequately assign a required number of servers to a service so as not to decrease service level even in the case where the throughput is changed with time, or where the access number is unexpectedly increased in an environment where there is a range of variation in the performance between servers.

Second Embodiment

Figure 15:
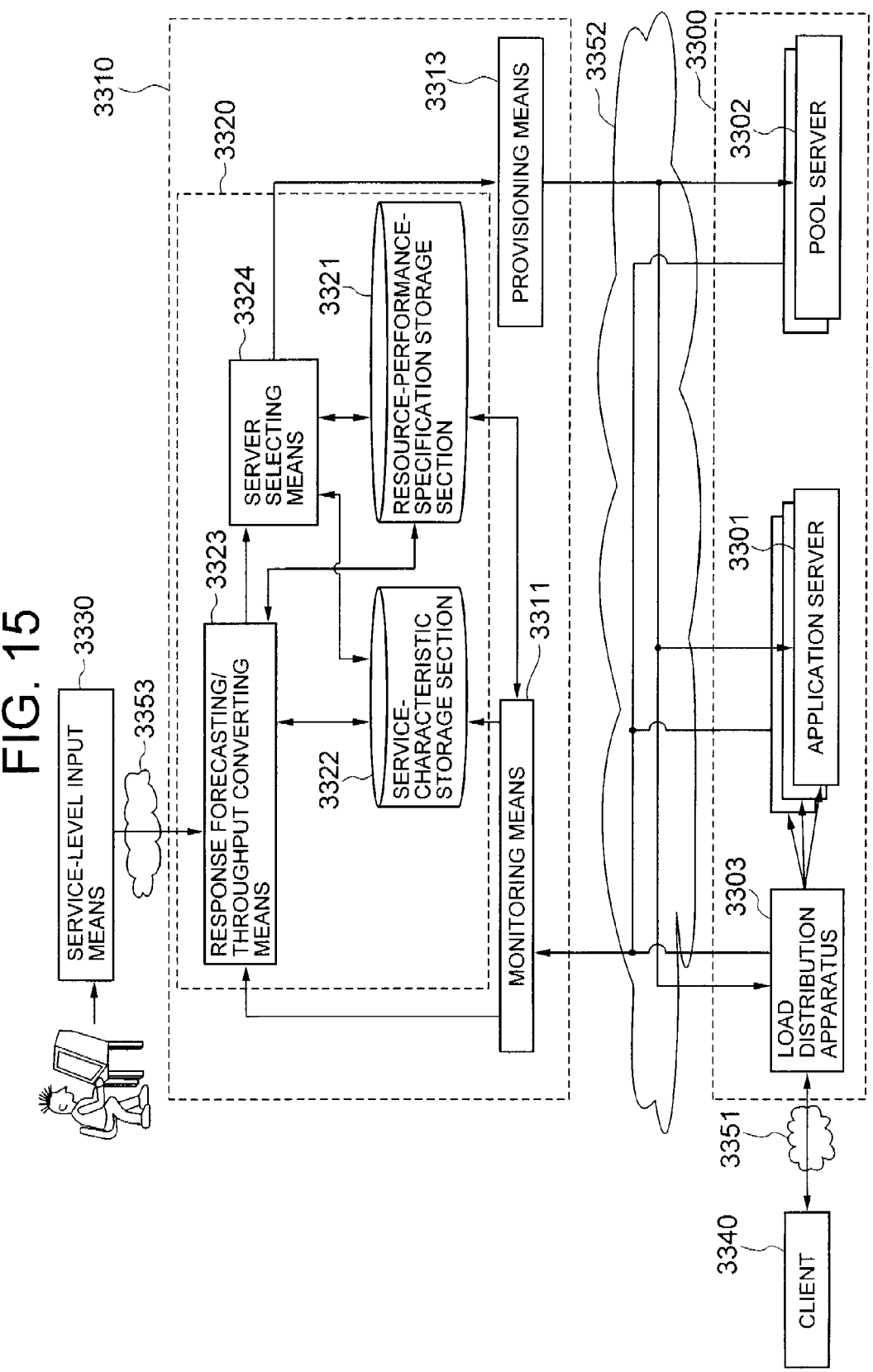
FIG. 15 is a block diagram showing a second embodiment of the server-resource management system according to the present invention.

A second embodiment of the present invention will next be described below with reference to the accompanying drawings. FIG. 15 is a block diagram showing a second embodiment of a server-resource management system according to the present invention. The server-resource management system shown in FIG. 15 includes a management-targeted system 3300, a management system 3310 for managing the management-targeted system 3300, and a service-level input means 3330 for inputting the service level of a management-targeted service to the management system 3310.

The management-targeted system 3300 can communicate with a client 3340 through a communication network 3351 such as the Internet. The management system 3310 is communicably connected to the management-targeted system 3300 and service-level input means 3330 through communication networks 3352 and 3353 such as the Internet.

The management-targeted system 3300 includes application servers 3301, pool servers 3302, and a load distribution apparatus 3303. The application servers 3301 are each equipped with a service application and execute a service assigned by the load distribution apparatus. The pool servers 3302 are not each used by a specific service application, and are shared among a plurality of services. The load distribution apparatus 3303 distributes requests made to applications among the application servers.

The management system 3310 includes a monitoring means 3311 for monitoring the application servers 3301, pool servers 3302 and load distribution apparatus 3303, a resource-capacity planning means 3320 for calculating the number of servers required for maintaining service quality, and a provisioning means (configuration changing means) 3313 for providing a specific service application program with the pool server 3302 shared among a plurality of services and executes configuration control such as registration of addresses of servers in the load distribution apparatus 3303.

The resource-capacity planning means 3320 includes a response forecasting/throughput converting means (difference predicting/throughput calculating means) 3323, a service-characteristic storage section 3322, a resource-performance-specification storage section 3321, and a server selection means 3324.

Figure 16:
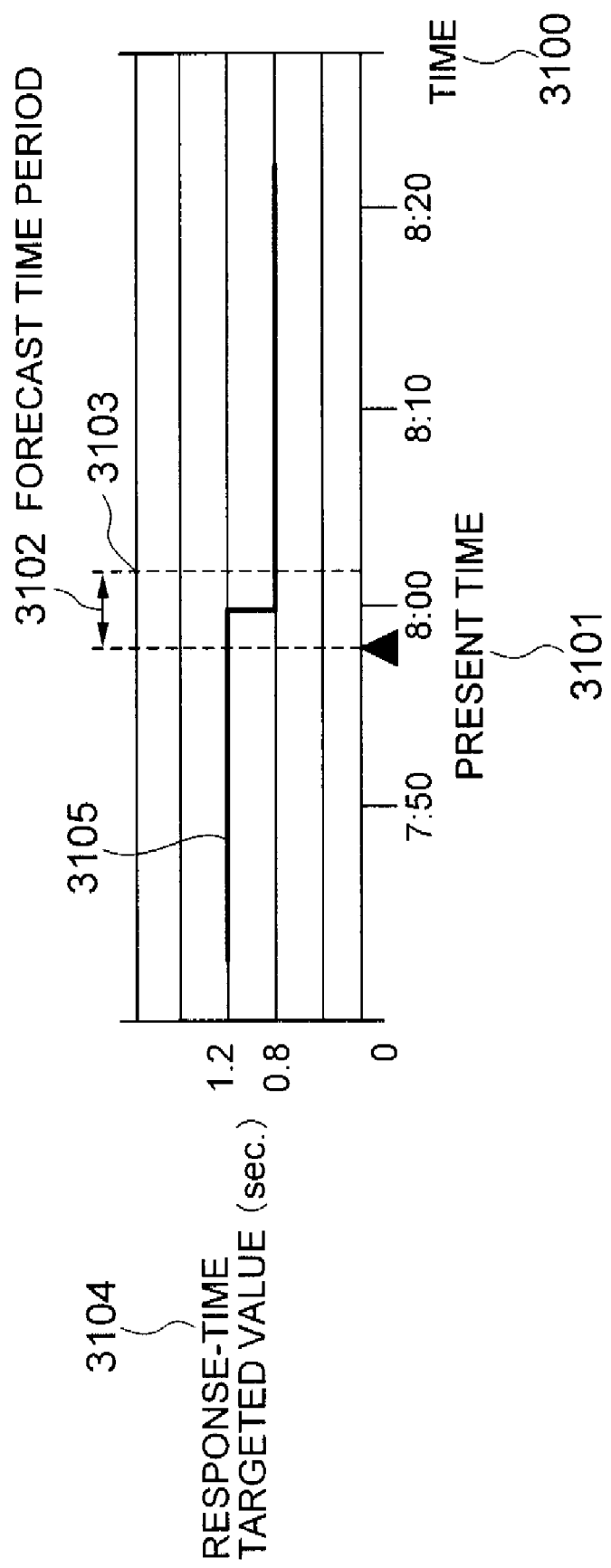
FIG. 16 is a diagram showing the setting state in the case where the target value of response time is input as time-series information.

FIG. 16 is an explanatory view showing a setting state in the case where a service administrator inputs a target value of response time as time-series information. The service administrator uses the service-level input means 3330 to input the target value of response time to the response forecasting/throughput converting means 3323. FIG. 16 shows a case where the target value of response time is set to 1.2 sec. by 8 o'clock and to 0.8 sec. after 8 o'clock.

The response forecasting/throughput converting means 3323 acquires, from the target values of response time input from the service-level input means 3330, a target value of response time at the present time and target value of response time at a time instant after a predetermined time length required for the provisioning means 3313 to complete provisioning processing has elapsed from the present time. The response forecasting/throughput converting means 3323 compares the target values of response time at the future time and the present time with each other and converts the comparison result into a change in the throughput.

The above processing performed by the response forecasting/throughput converting means 3323 is similar to the processing performed by the response-time-difference calculation/request-number conversion means 523 in the first embodiment, if that the target value of response time at the present time in the first embodiment is replaced by the monitored result of the response time, and future response time is replaced by the target value of response time. As in the case of the first embodiment, the response forecasting/throughput converting means 3323 performs a technique that first calculates a difference between the target values of response time and then assigns the calculation result to the quantitative model together with the performance-specification information of each server and service characteristics so as to output a change in the throughput or a technique that first assigns the performance-specification information of each server, service characteristics, and difference between the target values of response time to the quantitative model, respectively and then calculates a difference between the obtained throughputs.

The change of throughput obtained by one of the above techniques is input to the server selection means 324, and then the server selection means 324 performs a processing similar to that performed by the server selection means 524 in the first embodiment.

Figure 17:
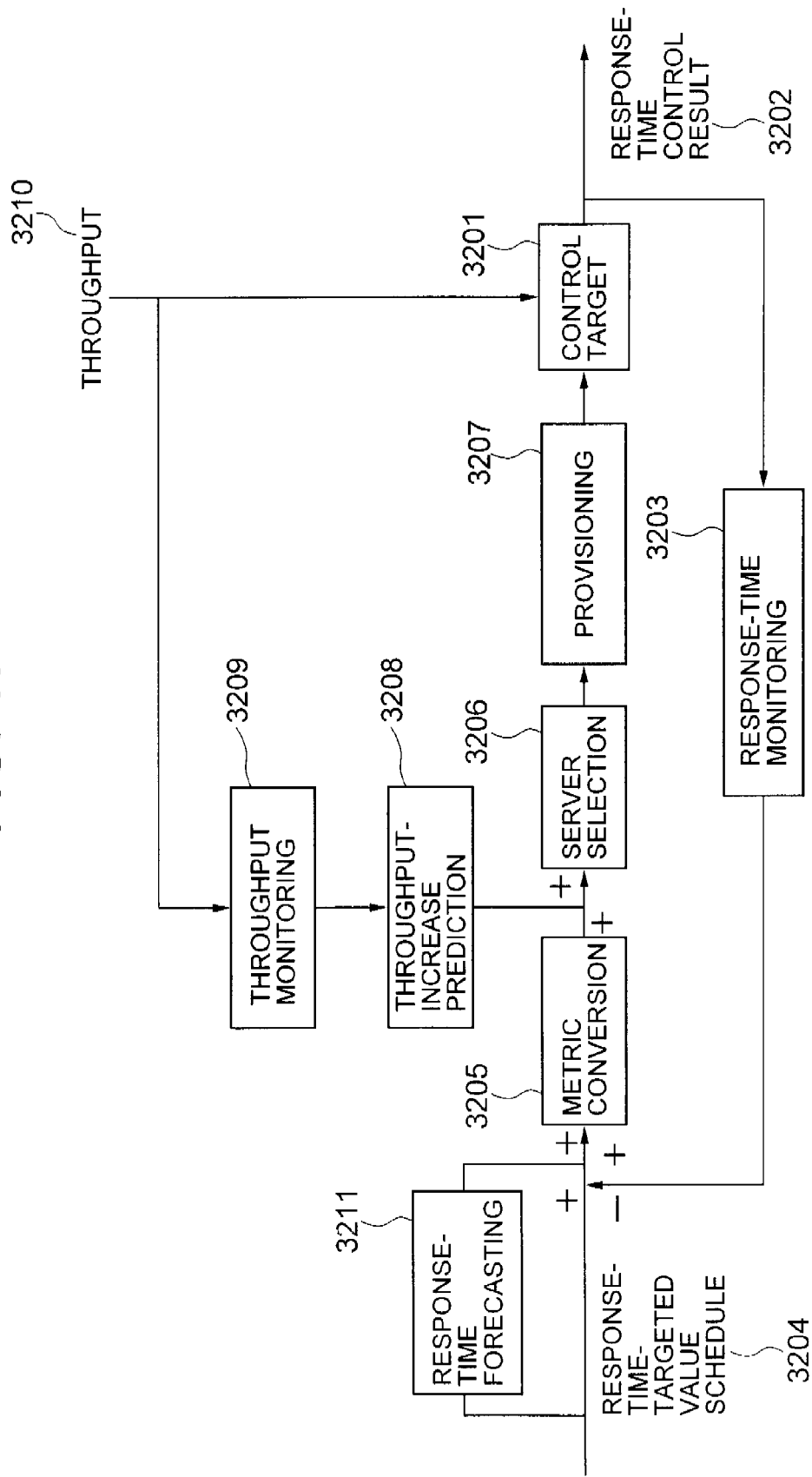
FIG. 17 is a block diagram showing a flow of a signal transfer in the second embodiment.
Figure 18:
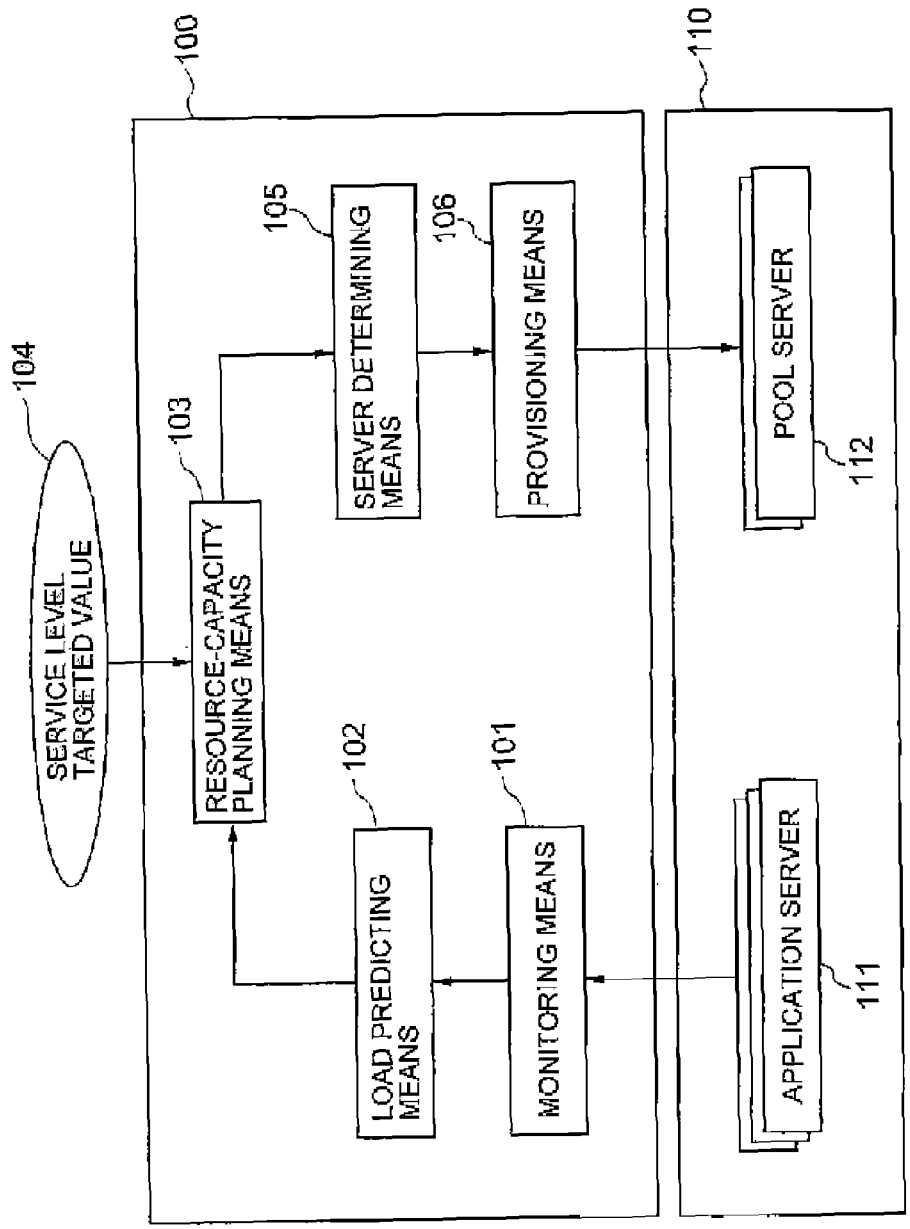
FIG. 18 is a block diagram showing an example of the configuration of a conventional server-resource management system.

FIG. 17 is a block diagram showing a flow of a signal transfer in the second embodiment. A throughput 3210, a target-value schedule of response time 3204, and a response-time control result 3202 are each a signal transmitted. A throughput monitoring 3209 and a response time monitoring 3203 are functions realized by the monitoring means 3311 of FIG. 15. A throughput-increase prediction 3208 and a metric conversion 1205 are functions realized by the response forecasting/throughput converting means 3323. A server selection 3206 is a function realized by the server selection means 3324. A provisioning 3207 is a function realized by the provisioning means 3313. A control target 3201 is a function realized by the application server 3301 and pool server 3302.

The signal flow represented by the block diagram of FIG. 17 corresponds to the processing flow in which the target-value schedule of response time 3204 is input, a difference between the target value of response time at the future time and target value of response time at the present time acquired by a response time forecasting mechanism 3211 is metrically converted into a throughput, and provisioning of servers having number/performance which corresponds to the throughput is applied to the control target.

Operation of the second embodiment will next be described using a concrete example. It is assumed, in the following description, that the management-targeted application servers are three management-targeted servers (2011, 2012, 2013) shown in FIG. 11 and that the service level values thereof differ from those of 2031, 2032, and 2033.

Further, it is assumed that the setting in which the target value of response time is changed from 1.2 sec. to 0.8 sec. at 8 o'clock is made as shown in FIG. 16 by the service-level input means 3330. Furthermore, it is assumed that the service-characteristic storage section stores therein, as the service information and model information of the servers 2011 to 2013, the service information shown in FIG. 14 and model information shown in FIG. 4, and that the resource-performance-specification storage section 3321 stores therein the performance-specification information shown in FIG. 12.

First, the response forecasting/throughput converting means 3323 monitors a value of the response time at the present time and response time at a time after a predetermined time length required for completion of the provisioning has elapsed from the present time. The target value of response time at a time instant when the present time corresponds to time 3103 shown in FIG. 16 is 1.2 sec., and target value of response time at time 3103 which is the time instant after the elapse of a time 3102 corresponding to a time length required for the provisioning means to complete the processing is 0.8 sec., so that the difference between the response times is 0.4 sec.

Thereafter, a combination of servers capable of cancelling the change of throughput is calculated based on the quantitative model 803, performance specification shown in FIG. 12, calculated change in the response time, and target value of response time at the future time in a manner similar to that of the first embodiment.

First, the response forecasting/throughput converting means 3323 calculates the change of throughput. More specifically, 0.018, 0.0096, and 0.0096 are each calculated as the change in the response time relative to the change of throughput from the quantitative model 803 and performance specification shown in FIG. 12.

For example, in the case of the management-targeted server 2011, the change in the response time relative to the change of throughput is calculated as follows. The service-1 is assigned to the management-targeted server 2011, and the quantitative model thereof is model-1. Thus, the quantitative model 803 can be represented as:

$$d(\text{response time})/d(\text{throughput}) = (\text{coefficient-1}) + (\text{coefficient-2}) \times (\text{CPU clock number}).$$

Thereafter, the performance specification included in the performance-specification information shown in FIG. 12 and coefficients included in the service information shown in FIG. 14 are assigned to the quantitative model 803. The performance specification (CPU clock number) of the management-targeted server 2011 is 1.8, coefficient-1 thereof is 0.030, and coefficient-2 thereof is −0.0068. As a result, 0.018 (=d(response time)/d(throughput)=0.030−0.0068×1.8) can be obtained.

By assigning the change in the response time "d(response time)" to the expression for calculating the d(response time)/d(throughput), the change of throughput "d(throughput)" can be obtained. In this case, 22, 42, and 42 are calculated for the management-targeted servers 2011 to 2013, respectively.

For example, in the case of the management-targeted server 2011, the change of throughput is calculated as follows. From d(response time)/d(throughput)=0.018, d(throughput)=d(response time)/0.018 is satisfied. The d(response time) is a change in the response time, and accordingly, by assigning 0.4 to the above expression, 22 (=d(throughput)=0.4/0.018) can be obtained.

When the calculated values of the change of throughputs of the respective application servers are summed up, 106 (=22+42+42) can be obtained. This value is passed to the server selection means 524 as the change of throughput.

Thereafter, the server selection means 524 selects servers corresponding to the output change of throughput. First, the server selection means 524 assigns the target value of response time (0.8) at the future time to the quantitative model 802 and further assigns the performance-specification information of servers in which the service assignment is "Pool" to thereby calculate throughputs of the respective servers. As a result, 11, 11, 61, and 61 can be obtained.

For example, the throughput of the server 2021 is calculated as follows. Since a server to which the service-1 is newly assigned needs to be calculated, the quantitative model 802 is defined as:

response time=(coefficient-1)×(throughput)+(coefficient-2)×(throughput)×(CPU clock number)+ (coefficient-3)×(CPU clock number)+(constant).

When the target value of response time at the future time is 0.8, coefficient-1 is 0.030, coefficient-2 is −0.0068, coefficient-3 is −0.33, and constant is 1.20 (see FIG. 14) are assigned to the quantitative model 802, 0.8=0.030×(throughput)−0.0068×(throughput)×(CPU clock number)−0.33×(CPU clock number)+1.20 can be obtained as a relational expression between the throughput and server performance specification.

Since the performance specification (CPU clock number) of the server 2021 is 1.8 (see FIG. 12), the above relational expression is represented as 0.8=0.030×(throughput)−0.0068×(throughput)×1.8−0.33×1.8+1.20. As a result, 11 can be obtained as the throughput.

Here, a value larger than and closest to the change of throughput "106" is achieved by a combination of the servers 2023 and 2024. Further, since the change of throughput is positive, processing to be performed as the configuration change of the selected servers is the addition control.

According to the second embodiment, in addition to the advantage of the first embodiment, it is possible to obtain the following advantage. That is, the change of throughput is calculated from the target value of response time at the future time and target value of response time at the present time, and accordingly, a feedforward control for distributing the predicted change of throughput between servers can be used to adequately assign a required number of server resources to a service.

It is possible to combine the first and second embodiments. For example, in the configuration shown in FIG. 15 of the second embodiment, the response forecasting/throughput converting means 3323 may further have the function of the response-time-difference calculation/request-number conversion means 523 shown in FIG. 1. In this case, the response forecasting/throughput converting means 3323 has: a function of calculating a difference between load per unit time on a server executing a specific service at the present time and load per unit time required for a target response time based on load per unit time and response time at the present time acquired by the monitoring means 3311, a previously specified target response time, performance information of the executing server by using a quantitative model corresponding to a specific service stored in the quantitative-model storage means 3322; and a function of calculating a difference representing an increase or decrease in load per unit time at a time after a predetermined time has elapsed based on load per unit time and response time at the present time acquired by the monitoring means 3322 and accumulated past history of load per unit time. The above functions are switched depending on a previously specified setting or automatically.

Although the present invention has been described with reference to the preferred embodiments thereof, the resource-amount calculation system, and the technique and program thereof according to the present invention are not limited to the above embodiments, and a resource-amount calculation system, and technique and program thereof obtained by making various modifications and changes in the configurations of the above-described embodiments are also included in the scope of the present invention.

INDUSTRIAL APPLICABILITY

The present invention can effectively be applied in order to maintain satisfactory service response time when a server provides a service to service consumers through a network.

The invention claimed is:

1. A resource-amount calculation system for calculating an available amount of server resources so as to allow a load distribution apparatus to distribute requests from clients, comprising:
 a performance-information storage section for storing therein performance information representing server performance of each server;
 a quantitative-model storage section for storing therein a quantitative model of each service representing a relationship among load per unit time applied from the clients, a response time of the each service that the each server provides, and the performance information;
 a monitoring section for acquiring load per unit time at the present time applied on one or more executing servers that execute a specific service and a response time of the specific service at the present time;
 a difference calculating section for calculating a difference between the load per unit time applied on the executing servers at the present time and load per unit time required for achieving a target response time, based on load per unit time at the present time and the response time acquired by the monitoring section, a previously specified target response time and performance information of the executing servers, by using the quantitative model corresponding to the specific service stored in the quantitative-model storage section;
 a throughput calculating section for calculating a throughput representing load per unit time that one or more backup servers now in out of service are capable of serving within the target response time, based on the performance information of the backup servers and target response time, by using the quantitative model corresponding to the specific service stored in the quantitative-model storage section;
 a server selection section for selecting an executing server or backup server having a throughput capable of cancelling the difference; and
 a configuration changing section for performing a configuration change to cause the server selected by the server selection section to execute or stop the specific service and outputting information relating to the configuration change of the server to the load distribution apparatus,
 wherein:
  if the difference is a positive value, the server selection section selects one or more backup servers having a combination throughput which is larger than and closest to the difference, whereas if the difference is a negative value, the server selection section selects one or more executing servers having a combination throughput which is smaller than and closest to the absolute value of the difference; and
  if the difference is the positive value, the configuration changing section performs a configuration change such that one or more backup servers selected by the server selection section execute the specific service, whereas if the difference is the negative value, the configuration changing section performs a configuration change such that one or more executing servers selected by the server selection section stop the specific service.

2. The resource-amount calculation system according to claim 1, wherein the load per unit time is a number of requests per unit time.

3. The resource-amount calculation system according to claim 1, wherein:
the difference calculating section calculates, based on a time-series target response time previously specified, a difference between load per unit time corresponding to a target response time at the present time and load per unit time corresponding to a target response time at a time instant after a predetermined time has elapsed from the present time.

4. A resource-amount calculation system for calculating an available amount of server resources so as to allow a load distribution apparatus to distribute requests from clients, comprising:
performance-information storage section for storing therein performance information representing server performance of each server;
quantitative-model storage section for storing therein a quantitative model of each service representing a relationship among load per unit time applied from the clients, a response time of the each service that the each server provides, and the performance information;
a monitoring section for acquiring load per unit time at the present time applied on one or more executing servers that execute a specific service and a response time of the specific service at the present time;
a difference calculating section for calculating a difference representing an increase or decrease in a number of loads per unit time predicted at a time instant after a predetermined time has elapsed from the present time, based on the load per unit time and response time at the present time acquired by the monitoring section and past history of load per unit time stored;
a throughput calculating section for calculating a throughput representing load per unit time that one or more backup servers now in out of service are capable of serving within the response time at the present time, based on the performance information of the backup servers and the response time at the present time, by using the quantitative model corresponding to the specific service stored in the quantitative-model storage section;
a server selection section for selecting an executing server or backup server having a throughput capable of cancelling the difference; and
a configuration changing section for performing a configuration change to cause the server selected by the server selection section to execute or stop the specific service and outputting information relating to the configuration change of the server to the load distribution apparatus, wherein:
if the difference is a positive value, the server selection section selects one or more backup servers having a combination throughput which is larger than and closest to the difference, whereas if the difference is a negative value, the server selection section selects one or more executing servers having a combination throughput which is smaller than and closest to the absolute value of the difference; and if the difference is the positive value, the configuration changing section performs a configuration change such that one or more backup servers selected by the server selection section execute the specific service, whereas if the difference is the negative value, the configuration changing section performs a configuration change such that one or more executing servers selected by the server selection section stop the specific service.

5. The resource-amount calculation system according to claim 4, wherein:
the difference calculating section further has a function of calculating, based on the load per unit time and response time at the present time acquired by the monitoring section, a previously specified target response time, performance information of the executing servers, a difference between the load per unit time applied on the executing server at the present time and load per unit time required for achieving the target response time, by using the quantitative model corresponding to the specific service stored in the quantitative-model storage section.

6. The resource-amount calculation system according to claim 5, wherein the load per unit time is a number of requests per unit time.

7. The resource-amount calculation system according to claim 6, wherein:
the difference calculating section calculates, based on a time-series target response time previously specified, a difference between load per unit time corresponding to a target response time at the present time and load per unit time corresponding to a target response time at a time instant after a predetermined time has elapsed from the present time.

8. A resource amount calculation method for calculating an available amount of server resources for a load distribution apparatus to distribute requests from clients, comprising:
storing performance information representing server performance of each server; storing a quantitative model of each service representing a relationship among load per unit time applied from the clients, a response time of the each service that the each server provides, and performance information;
acquiring load per unit time at the present time applied on one or more executing servers that execute a specific service and a response time of the specific service at the present time;
calculating a difference between the load per unit time applied on the executing servers at the present time and load per unit time required for achieving a target response time, based on load per unit time at the present time and the response time acquired by the monitoring step, a previously specified target response time and performance information of the executing server, by using the quantitative model corresponding to the specific service;
calculating a throughput representing load per unit time that one or more backup servers now in out of service are capable of serving within the target response time, based on the performance information of the backup servers and target response time, by using the quantitative model corresponding to the specific service;
selecting an executing server or backup server having a throughput capable of cancelling the difference; and
performing a configuration change to cause the server selected by the server selection step to execute or stop the specific service and outputting information relating to the configuration change of the server to the load distribution apparatus, wherein:

if the difference is a positive value, the server selection section selects one or more backup servers having a combination throughput which is larger than and closest to the difference, whereas if the difference is a negative value, the server selection section selects one or more executing servers having a combination throughput which is smaller than and closest to the absolute value of the difference; and if the difference is the positive value, the configuration changing section performs a configuration change such that one or more backup servers selected by the server selection section execute the specific service, whereas if the difference is the negative value, the configuration changing section performs a configuration change such that one or more executing servers selected by the server selection section stop the specific service.

9. The resource amount calculation method according to claim 8, wherein the quantitative mode storing stores a number of requests per unit time as the load per unit time.

10. A resource amount calculation method for calculating an available amount of server resources for a load distribution apparatus to distribute requests from clients, comprising:

storing performance information representing server performance of each server;

storing therein a quantitative model of each service representing a relationship among load per unit time applied from the clients, a response time of the each service that the each server provides, and performance information;

acquiring load per unit time at the present time applied on one or more executing servers that execute a specific service and a response time of the specific service at the present time;

calculating a difference representing an increase or decrease in a number of loads per unit time predicted at a time instant after a predetermined time has elapsed from the present time, based on the load per unit time and response time at the present time and past history of load per unit time;

calculating a throughput representing load per unit time that one or more backup servers now in out of service are capable of serving within the response time at the present time, based on the performance information of the backup servers and the response time at the present time, by using the quantitative model corresponding to the specific service;

selecting an executing server or backup server having a throughput capable of cancelling the difference; and performing a configuration change to cause the selected server to execute or stop the specific service and outputting information relating to the configuration change of the server to the load distribution apparatus, wherein:

if the difference is a positive value, the server selection section selects one or more backup servers having a combination throughput which is larger than and closest to the difference, whereas if the difference is a negative value, the server selection section selects one or more executing servers having a combination throughput which is smaller than and closest to the absolute value of the difference; and if the difference is the positive value, the configuration changing section performs a configuration change such that one or more backup servers selected by the server selection section execute the specific service, whereas if the difference is the negative value, the configuration changing section performs a configuration change such that one or more executing servers selected by the server selection section stop the specific service.

11. The resource amount calculation method according to claim 10, further comprising:

calculating a difference between the load per unit time applied on the executing servers and load per unit time at the present time required for achieving a previously specified target response time, based on the load per unit time and response time at the present time, the target response time, performance information of the executing servers, by using the quantitative model corresponding to the specific service.

12. The resource amount calculation method according to claim 10, wherein the quantitative model storing stores a number of requests per unit time as the load per unit time.

13. A non-transitory computer readable medium encoded with a computer program on which a control processing unit (CPU) is run, said program being capable of causing said CPU to:

store performance information representing server performance of each server;

store a quantitative model of each service representing a relationship among load per unit time applied from the clients, a response time of the each service that the each server provides, and performance information;

acquire load per unit time at the present time applied on one or more executing servers that execute a specific service and a response time of the specific service at the present time;

calculate a difference between the load per unit time applied on the executing server at the present time and load per unit time required for achieving a previously specified target response time, based on the load per unit time and response time at the present time acquired by the monitoring step, the target response time and performance information of the executing server, by using the quantitative model corresponding to the specific service;

calculate processing for calculating a throughput representing load per unit time that one or more backup servers now in out of service are capable of serving within the target response time, based on the performance information of the backup servers and the target response time, by using the quantitative model corresponding to the specific service;

select an executing server or backup server having a throughput capable of cancelling the difference; and perform a configuration change to cause the selected server to execute or stop the specific service and output information relating to the configuration change of the server to the load distribution apparatus, wherein:

if the difference is a positive value, the server selection section selects one or more backup servers having a combination throughput which is larger than and closest to the difference, whereas if the difference is a negative value, the server selection section selects one or more executing servers having a combination throughput which is smaller than and closest to the absolute value of the difference; and if the difference is the positive value, the configuration changing section performs a configuration change such that one or more backup servers selected by the server selection section execute the specific service, whereas if the difference is the negative value, the configuration changing section performs a configuration change such that one or more executing servers selected by the server selection section stop the specific service.

14. The program according to claim 13, wherein the quantitative mode storing stores a number of requests per unit time as the load per unit time.

15. A non-transitory computer readable medium encoded with a computer program on which a control processing unit (CPU) is run, said program being capable of causing said CPU to:
    store performance information representing server performance of each server;
    store a quantitative model of each service representing a relationship among load per unit time applied from the clients, a response time of the each service that each server provides, and the performance information;
    acquire load per unit time at the present time applied on one or more executing servers that execute a specific service and a response time of the specific service at the present time;
    calculate a difference representing an increase or decrease in a number of loads per unit time predicted at a time instant after a predetermined time has elapsed from the present time, based on the load per unit time and response time at the present and past history of load per unit time;
    calculate a throughput representing load per unit time that one or more backup servers now in out of service are capable of serving within the target response time, based on the performance information of the backup servers and the response time at the present time, by using the quantitative model corresponding to the specific service;
    select an executing server or backup server having a throughput capable of cancelling the difference; and
    perform a configuration change to cause the selected server to execute or stop the specific service and outputting information relating to the configuration change of the server to the load distribution apparatus,
    wherein:
        if the difference is a positive value, the server selection section selects one or more backup servers having a combination throughput which is larger than and closest to the difference, whereas if the difference is a negative value, the server selection section selects one or more executing servers having a combination throughput which is smaller than and closest to the absolute value of the difference; and
        if the difference is the positive value, the configuration changing section performs a configuration change such that one or more backup servers selected by the server selection section execute the specific service, whereas if the difference is the negative value, the configuration changing section performs a configuration change such that one or more executing servers selected by the server selection section stop the specific service.

16. The program according to claim 15, further being capable of causing the computer to:
    calculate a difference between the load per unit time applied on the executing server at the present time and load per unit time required for achieving a previously specified target response time, based on the load per unit time and response time at the present time acquired by the acquiring step, the target response time, performance information of the executing servers, by using the quantitative model corresponding to the specific service stored.

17. The program according to claim 15, wherein the quantitative model storing stores a number of requests per unit time as the load per unit time.

\* \* \* \* \*